Nov. 18, 1952 T. F. ESERKALN 2,618,202
MACHINE TOOL TRANSMISSION AND CONTROL MECHANISM
Filed June 25, 1945 5 Sheets-Sheet 1

Theodore F. Eserkaln
BY W. D. O'Connor
Attorney

Nov. 18, 1952 T. F. ESERKALN 2,618,202
MACHINE TOOL TRANSMISSION AND CONTROL MECHANISM
Filed June 25, 1945 5 Sheets-Sheet 3

Theodore F. Eserkaln
By W. D. O'Connor
Attorney

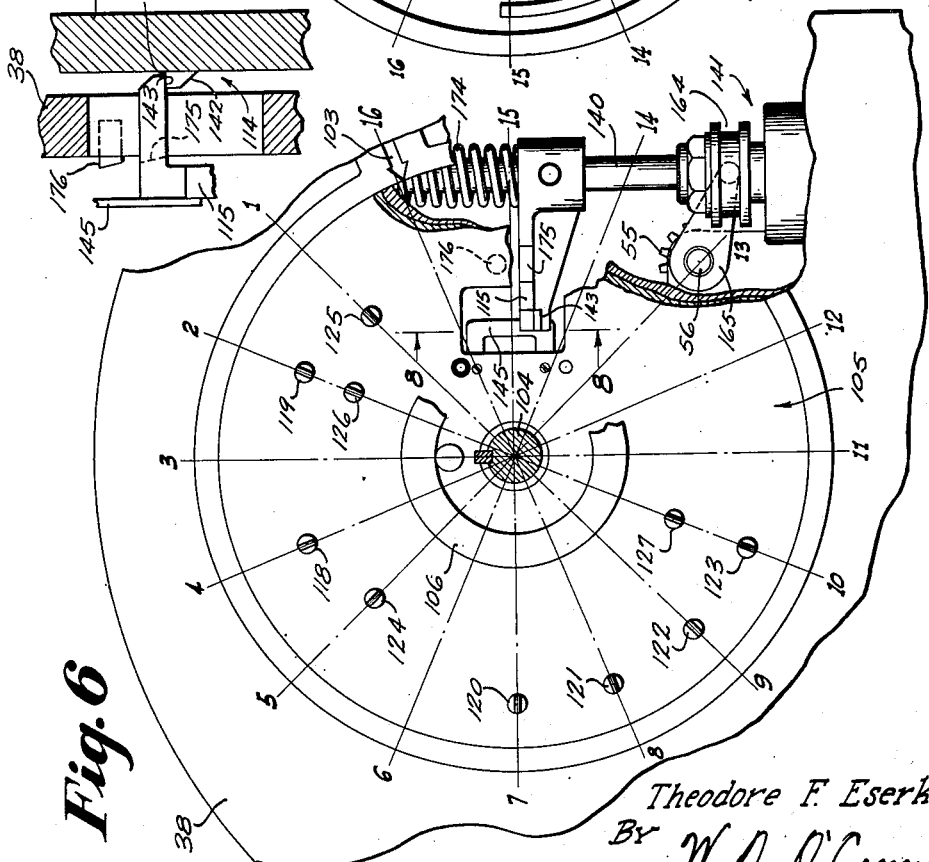

Nov. 18, 1952     T. F. ESERKALN     2,618,202
MACHINE TOOL TRANSMISSION AND CONTROL MECHANISM
Filed June 25, 1945     5 Sheets-Sheet 5
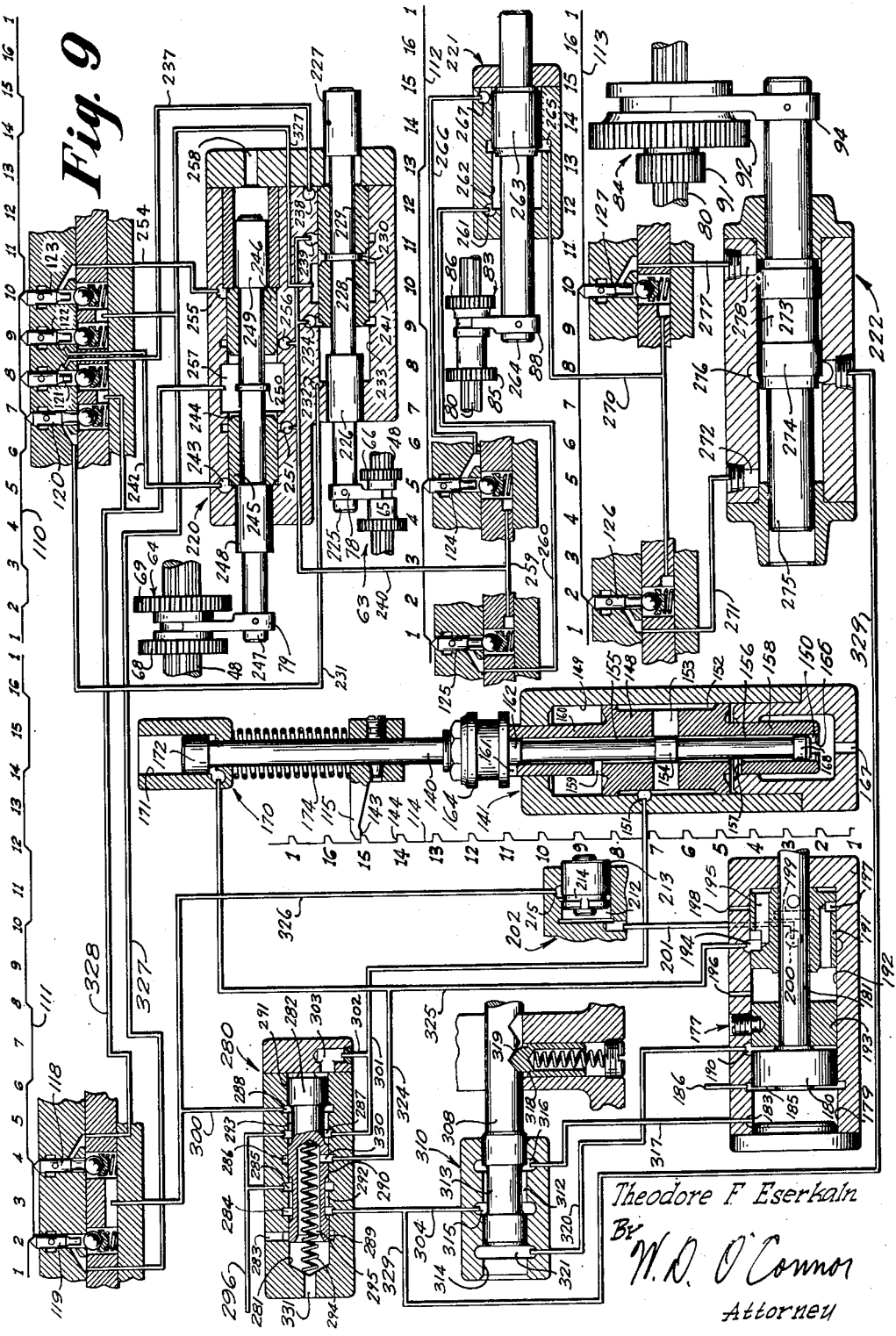
Theodore F. Eserkaln
By W. D. O'Connor
Attorney Patented Nov. 18, 1952

2,618,202

UNITED STATES PATENT OFFICE 2,618,202

MACHINE TOOL TRANSMISSION AND CONTROL MECHANISM

Theodore F. Eserkaln, Wauwatosa, Wis., assignor to Kearney & Trecker Corporation, West Allis, Wis., a corporation of Wisconsin Application June 25, 1945, Serial No. 601,416

24 Claims. (Cl. 90—18)

This invention relates, generally, to improvements in machine tools and more particularly to an improved transmission and control mechanism for a machine tool.

A general object of the invention is to provide an improved transmission and control mechanism for controlling the operation of machine tool elements.

Another object of the invention is to provide an improved hydraulic transmission and control mechanism for a machine tool capable of readily effecting infinitely variable speed changes throughout a wide range of operation.

Another object is to provide an improved machine tool power transmission control mechanism including a hydraulic control system for cooperative adjustment of a fixed-step speed transmission and an infinitely variable speed transmission.

Another object is to provide an improved speed changing apparatus including an infinitely variable speed transmission serially connected with a fixed-step speed transmission and both cooperatively adjustable to accomplish an infinite number of driving ratios within a wide range of operation.

Another object of the invention is to provide an improved machine tool speed changing apparatus including control means operating on fixed step and infinitely variable speed changers and functioning to disconnect the driving power source, effect slow rotation of the mechanism and perform speed changing operations in prearranged sequence.

Another object of this invention is to provide an improved control mechanism for a machine tool including a manually rotatable control element provided with a speed indicating dial and operable upon a series of hydraulic control valves to hydraulically operate a series of shifter mechanisms connected to a fixed-step speed transmission and an infinitely variable speed transmission.

Another object is to provide an improved hydraulic machine tool power transmission control mechanism for a milling machine including a hydraulic cam actuated control system for a fixed-step speed mechanism and an infinitely variable speed mechanism.

According to this invention, a hydraulic control for a transmission is provided whereby the speed selection for a fixed-step mechanism and an infinitely variable mechanism in the transmission is synchronized to furnish an infinitely variable speed throughout the comparatively wide limits of operation of the transmission. The control mechanism consists of a rotatable dial bearing speed indicia on its face and a series of cams on its back, which operably engage hydraulic valves disposed in a control frame. The valves are hydraulically connected to gear shifters which, in turn, are each disposed to shift one of several gear clusters in the fixed-step transmission. After all of the gear shifters have functioned sequentially to engage certain of the transmission gears in effecting a desired operating ratio and the hydraulic infinitely variable control mechanism has been actuated subsequently to a predetermined position, a hydraulic circuit is completed which effects reengagement of the transmission with the power source and causes the machine spindle to be driven thereby at the preselected speed.

The foregoing and other objects of this invention, which will become more fully apparent from the following detailed specification, may be achieved by the particular transmission and control mechanism, constituting an exemplifying embodiment of the invention that is illustrated in and described in connection with the accompanying drawings, in which:

Fig. 6 is a fragmentary vertical view, taken substantially along the plane of the line 6—6 in Fig. 4, showing the position of the hydraulic control valves within the column directly behind the cam plate;

Fig. 7 is a view of the back of the dial and cam plate, showing the shape and position of the five control cams thereon;

Fig. 8 is a fragmentary vertical section, taken along the plane of the line 8—8 in Fig. 6, showing the positioning of the infinitely variable control arm on the cam; and Fig. 9 is a diagrammatic view of the complete hydraulic control circuit for effecting the desired control of the transmission.

The particular hydraulic control system for a machine tool transmission, as illustrated in the accompanying drawings, exemplifies the principles of the invention, although it is to be understood that the invention may readily be applied to and used with equal advantage in other transmissions of different construction.

Figure 1:
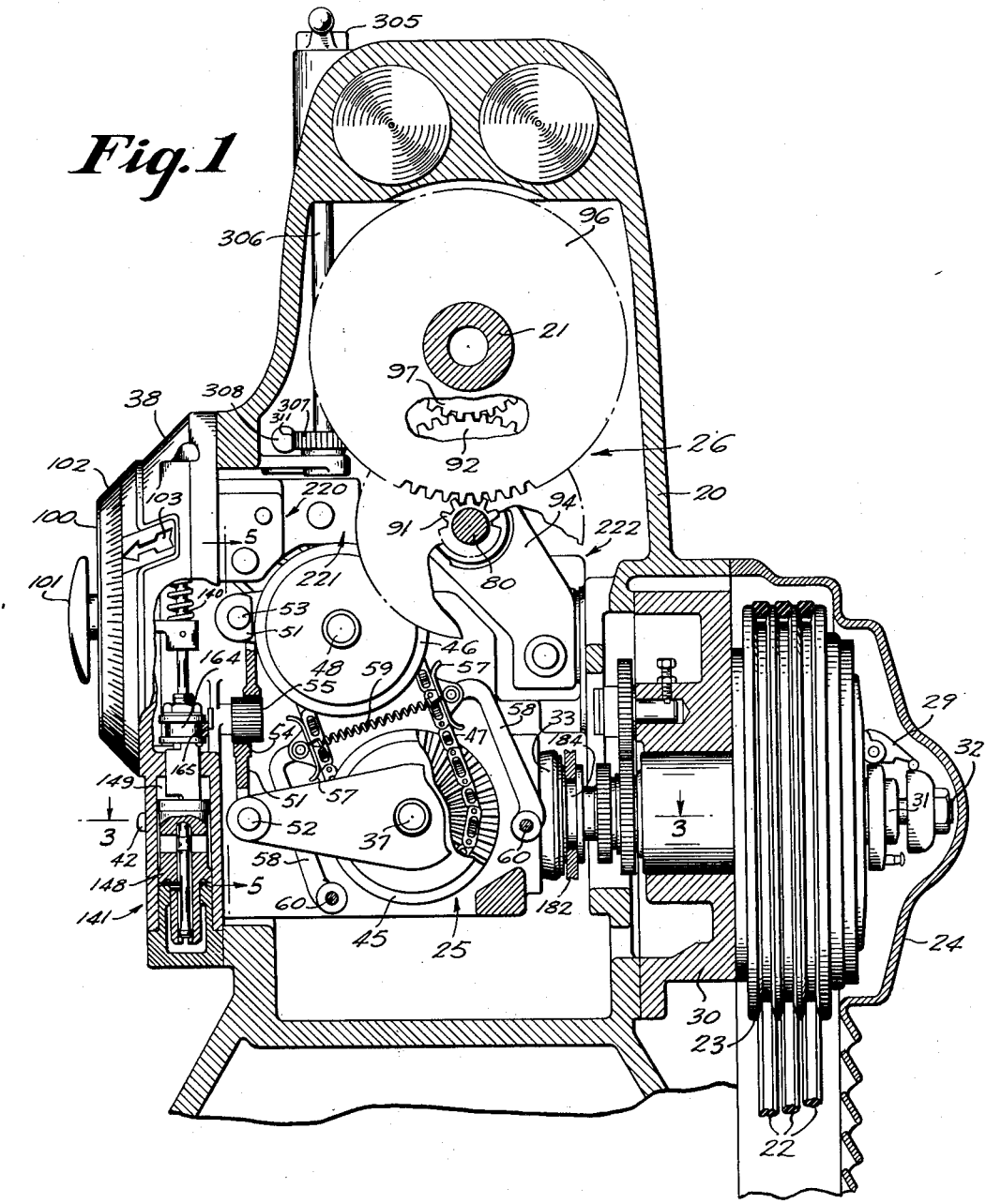
Figure 1 is a view in transverse vertical section through the upper portion of a milling machine showing the spindle transmission and associated speed selecting control mechanism embodying the present invention.
Figure 2:
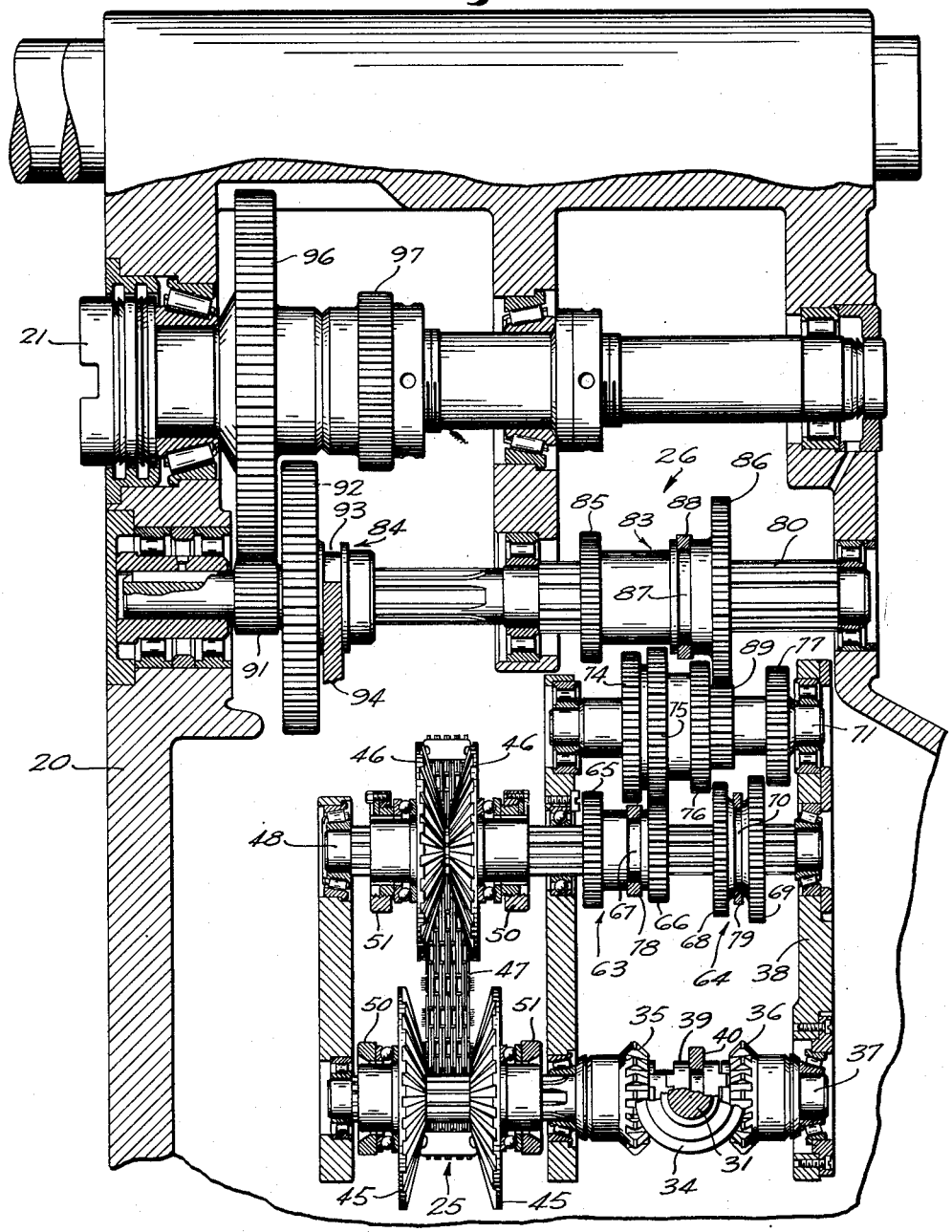
Fig. 2 is an enlarged longitudinal vertical sectional view through the upper portion of the milling machine column, showing the spindle driving mechanism including infinitely variable and fixed-step transmission units.

Referring more particularly to the drawings, and especially to Figs. 1 and 2 thereof, the transmission with the improved control mechanism, as shown therein, is incorporated in a standard, horizontal milling machine. The structure of the milling machine consists primarily of an upright column 20, a tool supporting spindle 21 horizontally journalled therein, and the usual cooperating work supporting knee, saddle and table assembly, not shown in the drawings.

Power for the milling machine is derived from an electric motor and pulley assembly, not shown, usually mounted in the base of the column 20, from which multiple V-belts 22 connect with a pulley 23. The pulley 23 is located on the right side of the column 20 and, with the other driving mechanism, is enclosed by a door 24.

Within the column 20, the pulley 23 is operatively connected to drive the tool spindle 21 at any predetermined speed throughout a comparatively wide range by means of the improved transmission mechanism embodying the invention.

The improved transmission consists primarily of a positive infinitely variable speed changing mechanism 25 and a fixed-step, speed changing mechanism 26 mounted in the column 20 and connected in series relationship. The mechanism 25 is arranged therein in such manner as to transmit power at any selected speed within a predetermined limited range from the pulley 23 to the fixed-step, speed-changing gear mechanism 26. The speed changing gear mechanism 26 consists of a series of shiftable gears so arranged that a predetermined series of gear ratios is available for driving the horizontal tool supporting spindle 21.

The fixed-step speed changing mechanism 26 is so designed that the steps between the successive driving ratios of this mechanism and the range of the infinitely variable speed changer 25 are proportioned to cooperate without overlapping or discontinuity. By this arrangement, the tool supporting spindle 21 may be operated at any one of an infinite number of speeds within the full range of the combined mechanisms. The speed changers may be adjusted cooperatively by a hydraulic control mechanism associated therewith whereby it is possible to operate the spindle 21 at any exactly predetermined speed, assuming that the pulley 23 is operating at a known constant speed.

The power driven pulley 23 (Fig. 1) is rotatably journalled in a clutch pulley bracket 30 on the side of the column 20 concentrically with a hollow main driving shaft 31 which extends through its hub. The main driving shaft 31 may be selectively connected to the pulley 23 by means of a friction clutch mechanism 29 operably disposed on its outer end. This clutch is controlled by a clutch operating rod 32 extending longitudinally through the center of the main driving shaft 31. The clutch operating rod 32 is hydraulically actuated and may be moved to any one of three positions. Movement of the clutch operating rod 32 to the right engages the clutch 29, causing the pulley 23 to drive the main driving shaft 31, while movement to the left disengages the clutch and permits the pulley 23 to rotate freely. A further movement to the left operates to engage the friction brake 33 for quickly stopping the rotation of the main shaft 31 and the entire spindle driving mechanism.

A bevel pinion 34 (see Figs. 2 and 3), fixed on the inner end of the main driving shaft 31, is disposed to constantly mesh with two similar opposed bevel pinions or gears 35 and 36. The opposed bevel gears 35 and 36 rotate oppositely from each other and are rotatably mounted on a shaft 37 disposed at right angles to the main driving shaft 31 in a removable speed box frame 38 which, in turn, is retained within a cavity in the left side of the column 20 by means of cap screws or the like (not shown). Splined to the shaft 37 between the two bevel gears 35 and 36 is a grooved clutch collar 39, which is movable in either direction to engage teeth thereon with corresponding clutch teeth on one or the other of the two gears, and thereby effect rotation of the shaft 37 in either direction selectively. The clutch collar 39 is operated by a shifter fork 40 fitted in the groove thereon, with the fork connected to a reversing linkage mechanism 41 mounted in the frame 34. Manipulation of the linkage mechanism 41 and the fork 40, to shift the collar 39, is effected by operating a reverse handle 42 conveniently disposed in the speed box 38 on the left side of the column 20.

Power is furnished to drive the infinitely variable speed drive mechanism 25 in the selected direction by the shaft 37 (see Figs. 1, 2, 3 and 5). This mechanism is mounted in the speed box frame 38 and includes two pairs of oppositely faced conical driving wheels 45 and 46, which are radially splined to engage with a laminated metal chain belt 47. The laminated plates in each of the link elements of the belt 47 are movably disposed for sidewise action in a well known manner, as dictated through engagement with the radial driving wheel splines to provide a positive though variable driving action between the belt and wheels. The primary pair of conical driving wheels 45 are slidably splined on the shaft 37 and impart a driving force via the belt 47 to the secondary pair of conical wheels 46, which are slidably mounted on a splined shaft 48 journalled in the speed box frame 38 parallel to shaft 37.

Figure 5:
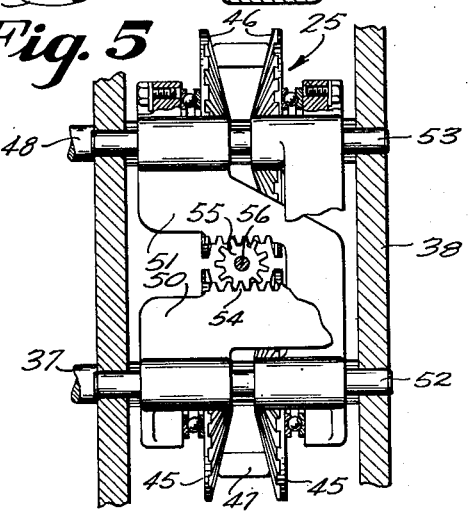
Fig. 5 is a fragmentary vertical sectional view of the infinitely variable drive and shifter mechanism, taken substantially along the plane of the line 5—5 in Fig. 1.

The effective diameters of the conical wheels 45 and 46 are simultaneously varied, so that the speed of the output shaft 48 may be increased or decreased while the speed of the input shaft 37 remains constant. The diametrical variation of the two pairs of conical wheels is accomplished by a pair of diagonally disposed double shifting forks 50 and 51 each slidably mounted on two guide rods 52 and 53, with each fork having a gear rack 54 on a central surface, as shown in Fig. 5. A control gear 55, mounted on a control shaft 56, meshes with both racks on the forks 50 and 51 so that rotation of the gear 55 will actuate the forks in opposite directions, respectively. Each fork is disposed to engage the hub and outer sidewall of one wheel of each pair of the conical wheels 45 and 46, by means of thrust bearings, which permit sidewise movement of the wheels, even though they are power driven. Thus, when the forks are moved in either direction, the effective diameter of one pair of conical driving wheels is reduced, while the effective diameter of the other pair of conical driving wheels is correspondingly increased, in a direct ratio.

With this construction, it is evident that a link belt 47 of a predetermined fixed length operably mounted on the two pairs of conical driving wheels 45 and 46 serves to transmit power positively from the shaft 37 to the shaft 48 at infinitely variable speed. A constant tension is maintained on the belt through the use of a pair of tension shoes 57, each freely pinned on a retaining arm 58 and resting on the opposite runs of the belt 47 intermediate the conical wheels 45 and 46, as shown in Fig. 1. A spring 59, stretched between the tension shoes 57, serves to maintain the necessary constant tension in the belt 47. The tension arms 58 are disposed to swivel freely on a pair of anchoring studs 60 in the frame 38.

As shown in Fig. 2, the power output shaft 48 of the infinitely variable speed-drive mechanism 25 transmits power to the fixed step speed changing mechanism 26, part of which is mounted in the speed box frame 38. The shaft 48 is splined and is journalled at three points in anti-friction bearings. Slidably mounted on the shaft 48 are two gear couplets or clusters 63 and 64, the cluster 63 comprising gears 65 and 66 with a shifting slot 67 between them, and the other cluster 64 comprising gears 68 and 69 with a shifting slot 70. Each of these gears may be selectively meshed with one or another of a series of complementary gears fixed on a shaft 71 disposed parallel to and above the shaft 48 and also journalled in the speed box frame 38. Thus, gear 65 and gear 66 of gear cluster 63 may be made to mesh with a gear 74 and a gear 75, respectively, on the shaft 71, while gear 68 and gear 69 in cluster 64 may be made to mesh with a gear 76 and a gear 77, respectively. The gear clusters 63 and 64 are slidably actuated by hydraulically operated forks 78 and 79 fitted in the slots 67 and 70, respectively. The hydraulic control system is so arranged that only one of the group of four gears is slidably positioned to engage with a mating gear at any one time, the other three gears being retained in neutral positions. Thus, the shaft 71 may be driven at any one of four speeds in relation to the speed of the shaft 48. The entire speed changing mechanism described thus far, including the drive shaft 31, is mounted in the frame 38 and, consequently, may be removed from the machine as a unit to facilitate repairs and adjustments.

Parallelly disposed above the shaft 71 is a primary shaft 80, journalled in appropriate bearings carried in the front, intermediate and rear walls of the column 20. Slidably splined on the shaft 80 are two gear clusters 83 and 84. The gear cluster 83 comprises a pair of gears 85 and 86 with a shifting slot 87 machined between them to receive a shifter fork 88. The fork 88, likewise, is hydraulically operated to shift the cluster 83 into either one of two positions, to engage either one of the two gears thereon selectively with companion gears on the shaft 71. Thus, the gear 85 will mesh with gear 74 on the shaft 71, when the cluster 83 is shifted to one position; and the gear 86 will mesh with a gear 89 on shaft 71, when the cluster 83 is moved to the second position. The gear 85 and gear 86 are so arranged that only one can be disposed in meshing engagement with its mating gear at any one time. The primary shifting unit, consisting of the two gears 85 and 86, when combined with the secondary unit consisting of the four gears 65, 66, 68 and 69, serves to effect rotation of the shaft 80 at any one of eight speeds for a given speed of the shaft 48.

The other gear cluster 84 is slidably splined on the fore end of the primary shaft 80 and constitutes a range change gear couplet consisting of a low-speed gear 91 and a high-speed gear 92 with a shifting slot 93 formed in the circumference of the clutser hub. A hydraulically operated range change fork 94 rides in the slot 93 and, when moved sidewise, effects axial movement of the gear cluster 84. Keyed to the tool spindle 21 is a relatively large bull gear 96, with which the gear 91 may mesh to effect rotation of the spindle 21 in the relatively low speed range, and a relatively small gear 97 which, when meshed with the gear 92, effects rotation of the spindle 21 in the relatively high speed range. Both the high speed range and the low speed range are so designed that each includes all of the speeds effected by both the infinitely variable speed drive mechanism 25 and the fixed step speed changing gear mechanism 26, without overlapping or discontinuity between the ranges. The range change mechanism, when combined with the fixed step speed changing mechanism 26, effects sixteen speed ratios of power transmission between the fixed step transmission input shaft 48 and the tool spindle 21.

In accordance with the present invention, as set forth herein, the range changing mechanism, the fixed step speed changing mechanism and the infinitely variable speed mechanism are adjusted cooperatively, by means of improved hydraulic control mechanism. Although this transmission is shown as including a positive infinitely variable speed mechanism and a fixed step speed mechanism, it is to be understood that the control mechanism may be applied to other types of speed changing mechanisms.

To provide for selecting any desired speed within the combined ranges of the several speed changing mechanisms, a manually operable cam control plate 100 is rotatably mounted on the speed box 38 at the left side of the column 20, as shown in Fig. 1. A handle 101, integrally formed with the plate, provides a means for turning the plate in either direction. A dial 102 (see Figs. 1 and 4), bearing spindle speed indicia expressing the full range of speeds in revolutions per minute, is attached to the periphery of the control plate 100. The spindle speed may be selected by rotating the plate until the desired speed is indicated thereon directly opposite a pointer 103 attached to the speed box frame 38. The cam control plate 100 is rotatably mounted on a stub shaft 104 embedded in the center of a recess in the outer face of the speed box frame 38. A hydraulic valve plate assembly 105 is keyed on the fixed shaft 104 directly behind the rotatable cam plate 100 in cooperating relationship therewith. A non-rotatable circular brake shoe 106 is resiliently retained in the assembly 105 to bear against a flat surface 107 on the inner side of the plate 100 and thereby restrain the latter member from rotating until such time as the operator manually rotates it to effect a desired spindle speed change.

The manipulation of the cam control plate by the machine operator effects, by a single means, coordinated adjustments of the infinitely variable speed mechanism and the two fixed step feed mechanisms. This is accomplished through a series of five circular cams 110, 111, 112, 113 and 114 (see Figs. 4 and 7), integrally machined in concentric relationship on the back of the cam control plate 100. When the cam plate is rotated, the four outer cam surfaces 110, 111, 112 and 113 engage and actuate a series of ten hydraulic control valves embeddedly retained in the valve plate assembly 105. The two outer cams 110 and 111 and associated control valves function cooperatively to effect coordinated shifting of the two gear clusters 63 and 64 on the input shaft 48. The next cam 112 controls the shifting of the gear cluster 83 on the shaft 80 and the cam 113 controls the shifting of the range change gear cluster 84. The inner cam 114 engages an actuating arm 115, which controls the adjustment of the infinitely variable drive mechanism through operation of a follow valve system.

In order to facilitate the explanation of the interrelationship of the cams on the cam plate and their relationship with the hydraulic control valves in the valve plate assembly 105, a series of sixteen radial lines delimiting the sixteen cam plate positions for establishing the sixteen fixed step driving ratios and numbered consecutively from one to sixteen are shown in Figs. 6 and 7, with each radial line passing through one of the sixteen raised lobes on the infinitely variable mechanism controlling cam 114. It will be seen that each of the four cams 110, 111, 112 and 113, controlling gear shifting within the fixed step transmission 26, are so positioned that the raised activating portions of the cams begin and end at points prescribed by these radial lines. Thus, in the case of the control cam 111, the raised activating portions extend over the circumferential distances between alternate radial lines and the depressed non-activating areas of the cam extend over corresponding distances. This cam, therefore, consists of four raised portions and four depressed portions, each of equal length. A pair of hydraulic control valves 118 and 119 are carried in the assembly 105 in position to be actuated by the cam 111 with their spacing so arranged that only one valve can be opened at any given instant.

In the case of the outer control cam 110, the four raised actuating portions each extend over the circumferential distance between adjacent radial lines, while the non-activating depressed areas each extend over three circumferential spacings between adjacent radial lines. Four hydraulic control valves 120, 121, 122 and 123, fixedly spaced on the valve assembly 105, engage this cam in such a manner that only one of the valves can be actuated by a raised portion of the cam at any given instant. These four valves operating on the cam 112 serve to hydraulically control the positioning of the two secondary gear clusters 63 and 64 in the fixed step speed transmission 26.

Two raised actuating portions of the control cam 112 extend over four circumferential distances between adjacent radial lines or one fourth of a circle, while the two depressed non-actuating intervening portions of the cam are of equal length. This cam serves to control the shifting of the primary gear cluster 83 in the fixed step transmission 26 via selective engagement with a pair of hydraulic control valves 124 and 125 mounted in the valve plate assembly 105. As in the two previous cases, these hydraulic control valves are so spaced that only one of them may be actuated by engagement with a raised portion of the cam at any one time. The range change control cam 113 serves to control the shifting of the range change gear cluster 84 in the fixed step transmission 26 to either one of two positions. The raised actuating portion of this cam extends over eight circumferential distances between adjacent radial lines or through one-half of a circle and the depressed non-actuating portion of the cam is of corresponding length. A pair of hydraulic control valves 126 and 127 in the assembly 105 are operated by this cam in such a manner that only one of them is opened at a particular instant.

Figure 4:
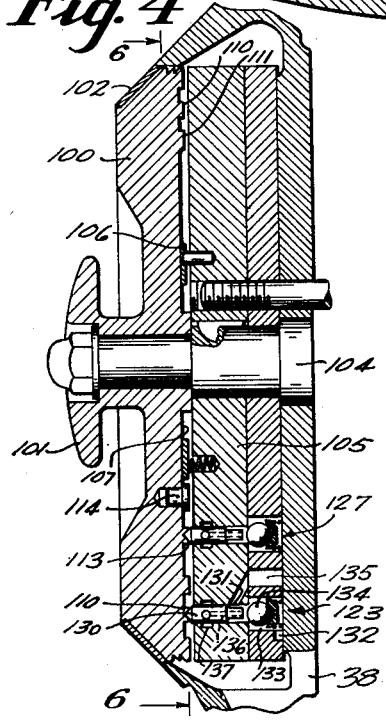
Fig. 4 is a vertical sectional view through the dial and cam plate shown in Fig. 1, illustrating the mounting thereof and the relationship of the cams thereon with the hydraulic control valves.

The ten hydraulic control valves 118 to 127 in the valve plate assembly 105 are identical in structure, two of them being shown in detail in Fig. 4. The design of these valves is similar to that of other valves generally used in hydraulic control circuits. Consequently, only one valve will be described in detail. Referring to valve 123 in Fig. 4, a piston 130 is disposed to freely operate in a cylinder 131 machined in the plate 105 in such a manner that a tapered end of the piston will engage the center of the secondary cam track 110. Hydraulic fluid, supplied through an intake port 132, will fill an enclosed cylindrical chamber 133, which lies adjacent to the inner end of the piston cylinder 131. A ball 134, resiliently retained within the chamber 133, seats against the inner peripheral edge of the cylinder 131 in a manner to prevent the flow of fluid from the chamber 133 into the cylinder. However, when the tapered outer end of the piston 130 engages a raised portion of the cam 110, the piston is forced inwardly until its opposite end engages the ball 134 and forcibly displaces it. The hydraulic fluid is then free to travel from the chamber 133 into the inner end of the cylinder 131 beyond a reduced portion of the piston 130 to an exhaust port 135. The fluid will continue to flow as long as the outer end of the piston 130 rides on the raised portion of the cam. When the cam plate 100 is rotated to a position in which the tapered end of the piston no longer engages an actuating portion of the cam, the ball 134 will again be seated to shut off the flow of hydraulic fluid to the exhaust port 135. Any subsequent back pressure in the hydraulic circuit connected to the port 135 will be relieved, since the fluid will then flow from this port into the inner end of the cylinder 131 behind the piston 130 and force the latter outwardly into full engagement with the depressed portion of the cam. This added outward movement of the piston 130 will permit the fluid to flow into a passageway 136 axially disposed in the center of the piston 130, which, in turn, connects with an auxiliary exhaust port 137 connected to atmosphere. When the piston 130 is depressed to open the hydraulic circuit through engagement with an actuating portion of the cam 110, the auxiliary exhaust circuit is blocked, since the inner end of the piston then engages the ball 134 to close the entrance to the passageway 136.

As previously explained, the positive infinitely variable speed drive mechanism 25 is cooperatively interconnected with the fixed step feed transmission 26 in such a manner that the speed range of the mechanism 25 may be fully utilized between each pair of adjacent fixed speed ratios of the mechanism 26. To this end, the control mechanism for the positive infinitely variable speed drive mechanism 25 is designed to adjust this mechanism through its full range of operation between any adjacent ones of the sixteen predetermined operating speed ratios furnished through the fixed step mechanism 26. Thus, sixteen raised actuating areas or ratchet teeth are provided on the infinitely variable mechanism control cam 114. Each of the raised portions of the cam are positioned on one of the sixteen aforementioned radial lines and serves to control the operation of the mechanism 25 through its full range of speed adjustment for each of the sixteen fixed speeds available from the fixed step speed mechanism 26. The actuating arm 115, which cooperates with the infinitely variable controlling cam or ratchet 114, is pinned on a stem 140 of a hydraulic positive infinitely variable follow valve mechanism 141, as shown in Fig. 6. In order to permit rotation of the cam control plate 100 in either direction while making a spindle speed selection, the top engaging face of the actuating arm 115 is tapered to engage with a correspondingly tapered surface 142 on each of the sixteen raised actuating portions or ratchet teeth of the cam 114, as detailedly shown in Fig. 8. An engaging surface 143 on the end of the actuating arm 115 will meet with a horizontally extending cam face 144 as the cam plate is rotated and cause the arm to be raised or lowered and, consequently, effect a variation in the adjustment of the control mechanism 141. Any slight adjustment of the cam plate 100 within the range of action of a particular infinitely variable cam lobe or ratchet tooth will be reflected directly in a movement of the arm 115. If it is necessary to go to the next succeeding tooth through a counterclockwise rotation of the plate 100, the engaging surface 143 of the arm 115 will merely leave the one tooth and drop downwardly to the face 144 of the next tooth. However, if it is desirable to return to a preceding lobe on the cam 114 through a clockwise rotation of the plate 100, the coacting tapered surfaces on the lobe and on the end of the actuating arm will meet in such manner that continued turning of the plate will cause the arm 115 to move backwardly away from the cam 114 against the pressure of a flat spring 145 normally disposed to retain the end of the arm in an engaged position against the cam, and thus allow the cam lobe to pass the arm 115. A hydraulic mechanism is provided to move the arm out of engagement with the cam 114 whenever the plate 100 is rotated through a distance greater than the range of a single lobe on the cam, as will be hereinafter described.

The positive infinitely variable hydraulic control follow valve mechanism 141 is mounted within the left front side of the speed box frame 38 in the columnar cavity in such manner that the stem 140 extends downwardly into the mechanism, as shown in Figs. 1, 6 and 9. As best shown in Fig. 9, a piston 148 is slidably disposed within a cylinder 149 formed in the body of the valve mechanism. The stem 140 extends downwardly into the cylinder 149 and is operably supported in a central bore 150 in the center of the piston 148. Hydraulic pressure fluid is supplied to an intake port 151, from whence it flows into a reduced diameter cylindrical cavity 152 about the peripheral mid-section of the piston 148. From this cavity, the fluid is free to flow into a connecting diametrical passage 153 in the piston 148. When the piston is retained in a balanced position in relation to a land 154 integrally formed on the stem 140, the said land serves to effectively block the passage of hydraulic fluid from the passage 153 to either of a pair of cylindrical cavities 155 and 156 on the stem directly above and below the land. However, when the cam dial plate is rotated to effect a movement of the cam 114, the corresponding movement of the arm 115 and the stem 140 will cause the land 154 to move upwardly or downwardly in the cylinder 150 depending upon the direction of rotation of the cam plate.

If an increased spindle speed is desired, the cam plate 100 is rotated in a counterclockwise direction a desired amount to raise the arm 115. This movement will cause the land 154 to be displaced upwardly from its central position with respect to the passage 153 in the piston 148 and permit the hydraulic fluid to flow from the piston passage 153 into the lower stem cavity 156. The fluid then flows through a port 157 in a lower extending boss 158 or tail rod of the piston 148 into the lower end of the cylinder 149 and, consequently, will hydraulically force the piston 148 to move upwardly until the fluid passage 153 is again blocked by the land 154 and a balanced condition is reestablished.

Any fluid to be exhausted from the upper end of the cylinder 149, in order to permit an upward movement of the piston 148, is then free to enter a port 159 in an upwardly extending boss or piston rod 160 integrally formed on the top of the piston 148 and extending upwardly through the top of the cylinder 149. The fluid in the top of the cylinder 149 is forced to enter the upper cylindrical cavity 155 between the stem and the piston and, since the land 154 is then positioned to prevent any downward flow, the fluid will be forced upwardly in the cavity until it reaches a port 161 in the upper piston boss 160 beyond the confines of the cylinder 149 from whence it is exhausted to atmosphere. When the land 154 on the stem 140 is raised above the passage 153, the fluid passage from the cavity 155 to the upper exhaust port 161 is opened, but when the land 154 assumes any other position with respect to the passage 153, the passage to the port 161 is blocked by a land 162 on the stem 140.

The upward movement of the piston 148 will cause a collar 164, mounted on an extension of the piston rod or upper boss 160 above the confines of the cylinder, to move upwardly a like distance. Consequently, a fork 165 (Figs. 1 and 6) riding on the collar 164 will be actuated and effect rotation of the shaft 56 and the gear 55 to adjustably vary the effective diameter of the conical driving wheels 45 and 46 in the positive infinitely variable speed mechanism 25, as previously described. Thus, a counterclockwise rotation of the cam plate 100 will effect a like rotation of the gear 55, as seen in Figs. 5 and 6, and cause the effective diameter of the driving wheels 45 to be varied with respect to the effective diameter of the driving wheels 46 and, consequently, the speed of the output shaft 49 will be increased proportionately.

Downward movement of the stem 140, resulting from a manual clockwise rotation of the cam plate 100 in order to decrease the speed of the spindle 21, will cause the land 154 to move downwardly and permit the hydraulic fluid to flow from the diametrical piston passage 153 into the upper cylindrical cavity 155 above the land 154 and the port 159 into the upper end of the cylinder 149. The hydraulic fluid under pressure will force the piston 148 to move downwardly in the cylinder 149 until a balanced condition thereof will occur in which the land 154 is again centered in the passage 153 to block the flow of fluid.

Any fluid to be exhausted from the bottom end of the cylinder 149, in order to allow a downward movement of the piston 148, will flow from the cylinder through the port 157 into the cylindrical cavity 156 below the land 154. From the cavity 156, the fluid will flow through a port 166 in the lower boss or tail rod 158 extending from the end of the piston 148 and an exhaust opening 167 in the bottom of the cylinder casing to atmosphere. The length of the cylindrical cavity 156 is such that the passage from the cavity to the port 166 is opened only when the land 154 has been moved to a point below the passage 153 in the piston 148. When the land 154 is centrally disposed in the passage or raised above the passage, a land 168 on the lower end of the stem 140 serves to block the port 166.

The downward movement of the piston 148 will effect a corresponding downward movement of the collar 164 which, in turn, will effect a clockwise rotation of the control gear 55 in the positive infinitely variable speed mechanism 25, as shown in Fig. 5. The shifter forks 50 and 51, associated with the conical driving wheels in the mechanism 25, will be actuated to adjust the wheels whereby the effective diameter of the driving wheels 45 will be varied in relation to the effective diameter of the driving wheels 46 and, consequently, the speed of the output shaft 48 will be decreased. Thus, the speed of the spindle 21 will, likewise, be decreased.

The aforedescribed movement of the positive infinitely variable control mechanism 141 and the control cam 114 associated therewith occurs only when it is necessary to effect a speed adjustment of the positive infinitely variable speed mechanism 25. When the machine tool is used for a cutting operation in which the speed of the cutter driven by the spindle 21 remains constant, the land 154 on the stem 140 of the hydraulic control mechanism 141 will continue to be retained in a central position relative to the diametrical passage 153 in the piston 148. Since the width of the passage 153 is slightly larger than the length of the land 154, a small amount of the hydraulic fluid will continue to flow through each of the cylindrical cavities 155 and 156 and the ports 157 and 159 into each end of the cylinder and, consequently, will lock the piston 148 in a balanced position. Therefore, the output speed of the infinitely variable speed mechanism 25 will not vary and, consequently, the speed of the spindle 21 will be held constant as long as the cam control plate 100 is not rotated.

If it is necessary to rotate the cam control plate 100 beyond the range of a single lobe on the cam 114 in making a spindle speed selection, a hydraulic actuating or neutralizing unit 170 (see Fig. 9) will function automatically to raise the arm 115 upwardly out of engagement with the infinitely variable control cam 114. The unit 170 consists of a cylinder 171 in which a piston 172 is hydraulically actuated. The piston is operatively attached to the top end of the rod 140, which extends upwardly through the bottom of the cylinder 171. The unit 170 is mounted in the speed box frame 38 within the column 20. A coil spring 174, abutting the bottom of the cylinder 171 and the top of the arm 115, serves to maintain contact between the engaging surfaces of the arm and the extending lobes of the cam 114. By introducing hydraulic fluid into the bottom of the cylinder 171, the piston 172 may be forced upwardly against the action of the spring 174 until the actuating arm 115 is raised to an out-of-contact position in relation to the infinitely variable control cam 114. In the course of upward movement to reach this position, a contact surface 175 on the arm 115 engages a tapered pin 176 anchored in the frame 38, as shown in Figs. 6 and 8. Thus, the arm is forced backwardly against the pressure of the spring 145 and out of engagement with the cam 114. The actuating arm will be retained in this position by fluid pressure until the cam control plate 100 is brought to rest at some desired spindle speed indicated thereon and the hydraulic circuit to the unit 170 is broken. The spring 174 then forces the fluid out of the cylinder 171 in order to effect a downward movement of the piston and rod assembly until the contact surface 143 on the arm 115 re-engages the contact face 144 on one of the sixteen extending lobes of the infinitely variable control cam 114. The positive infinitely variable control mechanism 141 is then free to effect an adjustment of the positive infinitely variable speed mechanism 25, as aforedescribed.

Figure 3:
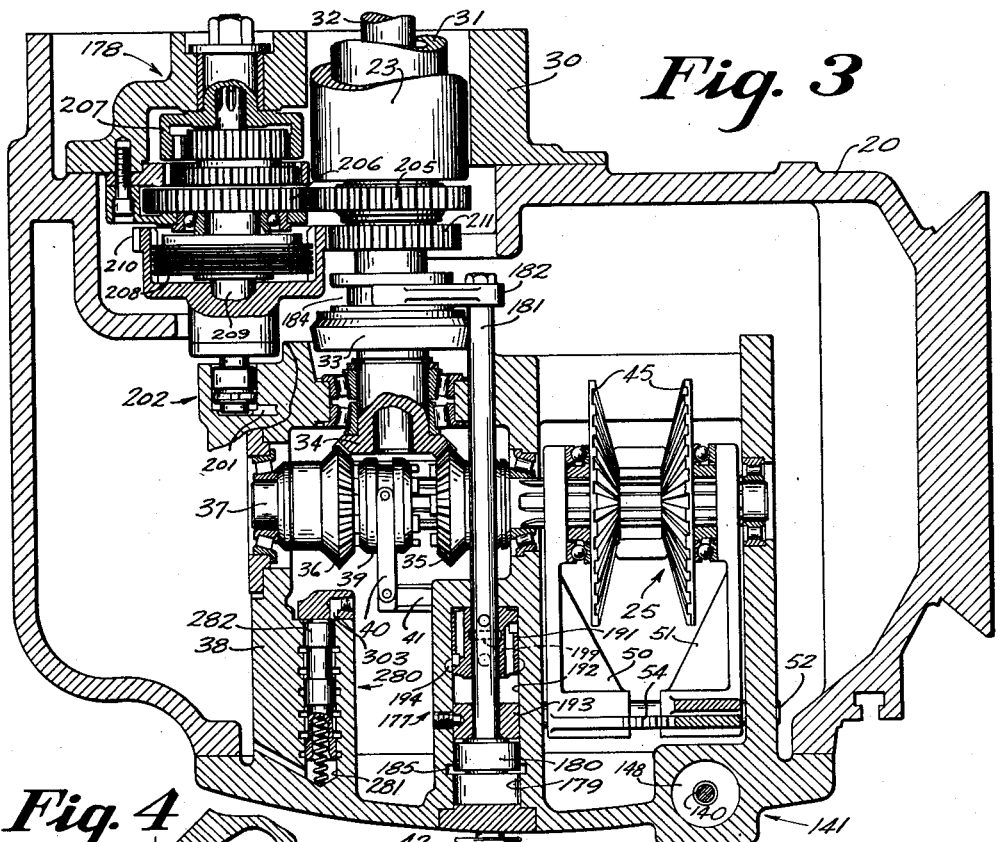
Fig. 3 is a horizontal sectional view, taken substantially along the plane of the line 3—3 in Fig. 1 and showing the slow speed drive mechanism, the reversing mechanism, and the lower portion of the infinitely variable transmission mechanism.

A clutch and brake hydraulic controlling mechanism 177, as shown in Figs. 3 and 9, serves to control the operation of the friction clutch mechanism 29, the friction brake mechanism 33 and a slow speed auxiliary driving mechanism 178 in the manner more fully set forth and claimed in U. S. Patent No. 2,345,171. The mechanism 177 is horizontally mounted within the lower confines of the speed box frame 38 disposed in the column 20. A cylinder 179 serves to cooperate with a piston 180 operably mounted on the end of a shifting rod 181. When the piston 180 is hydraulically actuated to effect an axial movement of the rod 181 and a shifter fork 182 on the opposite end thereof, the friction clutch 29 will be engaged or disengaged and the brake mechanism 33 will be simultaneously operated, depending upon the direction of movement of the shifter rod 181. Thus, if the hydraulic fluid is caused to enter the left end of the cylinder 179 through an intake port 183, as shown in Fig. 9, the piston 180 will be forced to move to the right. The rod 181 and the fork 182 attached thereto will move a corresponding distance. Since the fork 182 is operably mounted to ride in a slot 184 in the brake mechanism 33, the brake will be disengaged by this movement. As previously explained in connection with the description of the mechanism shown in Fig. 1, the rightward movement of the fork and the brake unit 33 will effect a corresponding rightward axial movement of the clutch operating rod 32 centrally disposed within the main driving shaft 31, since the unit 33 is mechanically linked to the inner end of the rod 32. This movement, in turn, will effect a movement of the clutch fingers and an engagement of the clutch plates within the clutch mechanism 29 in a well known manner and, consequently, will effect a driving connection between the main shaft 31 and the pulley 23. The piston 180 in the mechanism 177 will continue to move until a central exhaust groove 185 in the cylinder 179 is exposed. The hydraulic fluid will then be free to exhaust through this groove into a pipe 186 which is connected to the lubrication system of the machine tool. The fluid will continue to flow into the cylinder 179 to lock the piston 180 in position and, consequently, will retain the clutch in an engaged position to effect a continued drive to the main shaft 31.

If hydraulic fluid is introduced into a port 190 in the clutch-brake control mechanism 177, the piston 180 will be forced to move in a leftward direction from the position shown in Fig. 9. When the fluid enters the right end of the cylinder 179 under pressure, the fluid remaining in the left end of the cylinder is then free to exhaust through the port 183 which is then open to atmosphere. As the piston 180 moves to the left, the shifting rod 181, the shifting fork 182, the brake mechanism 33 and the clutch control rod 32 move a corresponding distance and effect disengagement of the clutch plates in the clutch assembly 29 to interrupt the driving engagement between the pulley 23 and the main driving shaft 31. The continued movement of the piston 180 in a leftward direction will cause the braking mechanism 33 to be actuated in the usual manner and, consequently, will exert a braking action upon the shaft 31, the positive infinitely variable speed mechanism 25, the fixed-step speed mechanism 26 and the tool retaining spindle 21. When the piston 180 has reached the extreme limits of travel at the left end of the cylinder 179, the hydraulic fluid entering the cylinder from the port 190 will then exhaust through the central port 185 and the line 186 to the lubrication system of the machine. With the piston 180 retained in this position, the entire spindle transmission mechanism is held stationary.

The clutch-brake control mechanism 177 also includes another piston 191 operably mounted in a cylinder 192, which is in axial alignment with the cylinder 179 and separated therefrom by a wall 193. The piston 191, likewise, is fastened to the shifting rod 181 for unitary operation therewith. When fluid is admitted to the cylinder 179, the piston 191 merely follows the movements of the rod 181 as the piston 180 is hydraulically actuated to engage or disengage the clutch and brake mechanisms, as previously described. However, when under certain conditions, a portion of the hydraulic control circuit is blocked, as will be explained hereinafter, the hydraulic fluid under pressure will be diverted into an annular port 194 in the middle of the cylinder 192. If the piston 180, rod 181 and piston 191 are in a clutch engaging position, the fluid will flow into a passageway 195 extending from the side wall of the piston 191 adjacent the port 194 to the right end of the cylinder. Thus, the hydraulic fluid will momentarily flow from the port 194 through the piston passage 195 to the right end of the cylinder 192 and force a leftward movement of the piston away from the right end of the cylinder 192. The flow of the hydraulic fluid into the right end of the cylinder will effect movement of the piston 191, the rod 181, fork 182, the brake mechanism 33, and the clutch control rod 32 to disengage the clutch mechanism 29.

Any hydraulic fluid in the left end of the cylinder 192 will be exhausted to atmosphere through an exhaust port 196. The movement of the piston 191 serves to completely dominate the movement of the rod 181 because the fluid remaining in the cylinder 179 is no longer under pressure and will be exhausted therefrom as the piston 180 is moved in the cylinder.

When the piston 191 has reached the clutch disengaging central position in the cylinder 192, a passage 197 therein, extending from the peripheral piston side wall to the left end of the piston 191, will permit a flow of hydraulic fluid from the port 194 to the left end of the cylinder 192. At the same time, another exhaust port 198 in the right end of the cylinder will be exposed at the right of the piston 191. The exhaust ports 196 and 198 at the left and right ends, respectively, of the cylinder 192 present reduced orifices to permit the exhaust of hydraulic fluid from the end cavities of the cylinder and, consequently, the continued application of pressure to the fluid within the central cylinder port 194 will eventually effect a balanced condition of the piston 191 centrally within the cylinder. When this has occurred, a recess 199 in the peripheral side wall of the piston 191 will be centered intermediate the circular intake port 194 and an adjacent port 200 in the side wall of the cylinder 192. The hydraulic fluid under pressure will be directed through the port 200 and a hydraulic line 201 to a slow speed operating mechanism 202. During this period, the piston 191 will continue to remain in a balanced neutral position, since a sufficient amount of hydraulic fluid will still continue to flow from the port 194 through the piston passages 195 and 197 to the right and left ends of the cylinder respectively, and both the clutch and the brake will remain disengaged.

The slow speed clutch actuating piston mechanism 202 is shown mounted in the column in Fig. 3 and in detail in Fig. 9. This mechanism serves to engage the clutch of the slow speed drive mechanism 178 and effect slow speed rotation of the positive infinitely variable speed mechanism 25, the fixed-step speed mechanism 26 and the spindle 21, in order to facilitate the shifting of the gear mechanisms therein during a speed-selecting cycle. The slow speed drive mechanism 178 is driven from a gear 205 mounted to rotate continuously with the driving pulley 23. The gear 205 meshes with a gear 206 which, in turn, serves to drive a planetary gear arrangement 207, wherein the comparatively high constant speed rate of the pulley 23 is reduced considerably to effect a very low output speed rate of the mechanism. The gearing 207 is mechanically connected to drive one element of a slow speed clutch 208 through a shaft 209. A driven element of the clutch 208 is integrally formed with an appending gear 210 on its outer periphery. The gear 210 serves to mesh with a gear 211 keyed on the main driving shaft 31 intermediate the gear 205 and the brake mechanism 33. When the clutch 208 is disengaged and the shaft 31 is being driven through the main clutch 29, the gear 211 will idly drive the gear 210. However, when the main clutch 29 and the brake 33 are both disengaged and the clutch 208 is engaged to effect a slow speed rotation of the transmission mechanism, the power will be transmitted from the pulley gear 205 through the slow speed drive mechanism 178 and, consequently, the clutch gear 210 will drive the main shaft gear 211 and effect slow speed rotation of the transmission mechanism to aid in the meshing of gear teeth when the gears therein are shifted into driving positions.

The clutch 208 in the slow speed drive mechanism 178 is actuated through the slow speed control apparatus 202 axially disposed adjacent the inner end of the shaft 209. When the hydraulic fluid under pressure is diverted through the clutch-brake control mechanism 177 to the hydraulic line 201, the fluid will enter the left end of a cylinder 212 of the slow speed control mechanism 202, as shown in Fig. 9. A piston 213 in the cylinder will be moved to actuate a control rod (not shown) centrally disposed within the shaft 209 and effect the engagement of the disks within the clutch 208 in a manner to transmit the rotative power to the main shaft 31. A more detailed description of the slow speed drive mechanism 178 and the control thereof is included in U. S. Patent No. 2,240,973.

When the clutch 208 in the slow speed drive mechanism 178 is disengaged, the piston 213 in the slow speed control mechanism 202 will remain at rest adjacent to the left end of the cylinder 212. The hydraulic fluid entering the cylinder will effect a rapid rightward movement of the piston 213. As soon as the hydraulic fluid can flow from a circumferential groove 214 in the piston 213 to an exhaust port 215 in the cylinder 212, the initial fluid pressure will be gradually dissipated and, consequently, the rightward movement of the piston will be gradually retarded. Thus, when the piston 213 approaches the right end of its travel in the cylinder 212, its movement is retarded in order to insure a gradual engagement of the friction clutch 208 in the slow speed drive mechanism 178. When the piston is in the extreme right position, the hydraulic fluid is free to travel through the cylinder 212 and the piston 213 to the exhaust port 215. The clutch 208 will remain engaged until the fluid pressure in the cylinder 212 is relieved, whereupon a spring (not shown) contained in the clutch mechanism will force the disengagement of the clutch disks and effect a movement of the piston to the extreme left position in the cylinder 212.

Shifting of the four gear clusters in the fixed-step transmission 26 is accomplished through a set of three hydraulic gear shifting mechanisms 220, 221 and 222. Gear shifter mechanisms 220 and 221 are located on the left side of the transmission cavity within the column 20 and are retainably mounted on the speed box frame 38, as shown in Fig. 1. The mechanism 220 controls the shifting of the two secondary gear clusters 63 and 64 in the fixed-step transmission 26, while the shifter mechanism 221 shifts the primary gear cluster 83 to either of two driving positions. The range change gear cluster 84 is slidably operated by means of the hydraulic gear shifting mechanism 222 mounted on the right side of the columnar cavity. A detailed view of the construction of the three gear shifter mechanisms 220, 221 and 222 is shown in Fig. 9.

The secondary gear shifter mechanism 220 consists of two interrelated hydraulic operating units, one of which serves to shift the gear cluster 63 into either one of two driving positions or to a neutral position, while the other unit serves to shift the gear cluster 64 into either of two driving positions or into a neutral position. The position of the two gear clusters 63 and 64 is initially determined by the position of the hydraulic valves 118 and 119 upon the cam 111 and is directly determined by the position of the four hydraulic valves 120, 121, 122 and 123 upon the secondary control cam 119. A hydraulic shifter rod 225 is slidably mounted in the secondary gear shifting mechanism 220 upon two enlarged portions 226 and 227 integrally formed therewith. The shifter fork 78, fixedly carried on the end of the rod 225 is mounted in the slot 67 of the gear cluster 63. A pair of pistons 228 and 229 are slidably mounted on the rod 225 intermediate the two enlarged portions of the rod. A contact collar 230 integrally formed on the shifter rod between the two pistons constitutes a bearing area, which either of the two pistons must engage in effecting a rightward or leftward movement of the shifter rod. The rightward movement of the rod is controlled through the hydraulic valve 120. If this valve is opened to permit a fluid flow through a line 231 to an intake port 232 at the extreme left end of a cylinder 233, the hydraulic fluid will cause the piston 228, slidably mounted in the cylinder, to move to the right until the piston engages the contact collar 230. The continued flow of hydraulic fluid into the left end of the cylinder 233 will then force the piston 228 and the shifter rod 225 rightwardly. The movement of the fork 78 on the end of the shifter rod and the movement of the gear cluster 63 will be such that the gear 66 thereon will be brought into mesh with the gear 75 on the shaft 71. The rightward movement of the piston and rod will be halted when an exhaust port 234 in the cylinder 233 is exposed.

Leftward movement of the shifter rod 225 in the secondary gear shifting mechanism 220 is hydraulically controlled through the valve 121. The valves 120 and 121 are designed to be operated by the action of the cam 110 in such a manner that only one of the two valves may be opened at any given instant. Thus, when the control valve 121 is opened through engagement with an elevated portion of the cam 110 to permit the flow of hydraulic fluid necessary to effect the leftward movement of the shifter rod 225, the control valve 120 is, of necessity, closed because it will then engage a depressed portion of the cam 110. When the control valve 121 is opened, the hydraulic fluid will flow from the valve through a line 237 to an intake port 238 at the extreme right end of the cylinder 233. The fluid will enter the cylinder and force the piston 229 therein leftward into engagement with the contact collar 230 and, thereafter, will effect a leftward movement of the shifter rod 225. Fluid remaining in the left end of the cylinder 233 at that time will be exhausted through the port 232, the line 231 and the auxiliary exhaust port of the closed control valve 120. The movement of the rod and the shifting fork 78 carried thereby will cause the secondary gear cluster 63 to slidably move until the gear 65 thereon is brought into mesh with the companion gear 74 on the shaft 71. The movement of the shifter rod is limited to the distance between the intake port 238 and an exhaust port 239, since the continued leftward movement of the piston 229 will bring about a condition wherein the port 239 is exposed and the hydraulic fluid will then flow from the cylinder through the port 239 to a common exhaust line 240. The piston will thereafter remain locked in position and, consequently, will serve to retain the gear cluster in the aforesaid driving position. Both ends of each of the pistons 228 and 229 are chamfered to permit the fluid to flow around the piston and initiate a directional movement in the cylinder 233, even though the piston may then be positioned at its extreme limit of travel against the end walls of the cylinder.

If the gear cluster 63 operably controlled by the aforedescribed unit of the secondary gear shifting mechanism 220 is to be retained in a third or neutral position out of contact with either of the two mating gears 74 or 75, the hydraulic fluid is diverted into a central neutralizing chamber 241 in the cylinder 233. The length of this annular chamber is sufficient to permit the flow directly behind either of the two pistons 228 or 229, when in an extreme position. At this time, both of the control valves 120 and 121 would be closed; thus, if hydraulic fluid under pressure is forced into the chamber 241, the fluid would enter the middle portion of the cylinder 233 and effect a movement of one of the pistons 228 or 229 and the shifter rod to a neutral position. Thus, for example, with the piston 228 positioned as shown in Fig. 9, the flow of the hydraulic fluid into the middle portion of the cylinder 233 would effect a leftward movement of the piston. This movement would bring it into abutting contact with the enlarged portion 226 at the left end of the rod 225, and a continued movement thereof would effect a leftward movement of the rod to a neutral position. The fluid remaining in the left end of the cylinder 233 is exhausted through the port 232, the line 231 and the auxiliary exhaust port of the closed valve 120 to atmosphere. As long as hydraulic fluid is retained under pressure in the neutralizing chamber 241, the gear cluster 63 operated by the shifter mechanism will be retained in a neutral non-engaged position on the shaft 48.

The other unit of the secondary gear shifting mechanism 220 serves to effect the movement of the gear cluster 64 in the fixed-step transmission 26 into one of three positions. This unit is controlled through the operation of the control valves 122 and 123 by the secondary control cam 110. Thus, when the piston in the valve 122 is opened through engagement with an elevated actuating portion of the cam, the hydraulic fluid is free to flow through the opened valve and a line 242 to an intake port 243 at the left end of a cylinder 244. A pair of pistons 245 and 246 are slidably mounted on a shifting rod 247 extending axially through the cylinder 244. The rod is slidably supported on two enlarged portions 248 and 249 affixed thereto at each end of the cylinder 244. A contact collar 250 fixedly mounted on the rod midway between the two enlarged end portions 248 and 249 serves to limit the movement of the pistons 245 and 246 upon their respective portions of the rod and to afford an engaging area against which the pistons may abut to move the shifting rod. Thus, when the hydraulic fluid is forced into the left end of the cylinder 244 from the intake port 243, the piston 245 will move toward the right until the opposite end thereof is brought into engagement with the collar 250. Thereupon, the continued rightward movement of the piston will accomplish a corresponding rightward movement of the shifter rod 247 until an exhaust port 251 in the cylinder 244 is exposed. This port is connected to the common exhaust line 240 and affords an outlet for the hydraulic fluid entering the left end of the cylinder after the movement of the piston has been completed. The head of fluid built up within the left end of the cylinder 244 is sufficient to lock the piston 245 and the shifter rod 247 in this position. Since the shifting fork 79 is fixedly carried on the end of the rod 247, movement thereof will effect movement of the gear cluster 64 on the splined shaft 48 and effectively mesh the gear 68 with the gear 76 in the fixed-step speed mechanism 26.

If, on the other hand, the hydraulic control valve 123 is opened by the engagement of the tapered valve piston with an elevated portion of the secondary control cam 110, the hydraulic fluid will flow through the opened valve and a line 254 to an intake port 255 at the extreme right end of the cylinder 244. This fluid will then enter the right end of the cylinder 244 behind the piston 246 and force it leftward on the shifting rod 247 into abutment with the collar 250. Thereafter, the shifting rod 247 will move axially with the piston 246 until an exhaust port 256 is exposed. The hydraulic fluid is then free to escape from the cylinder into the port 256 and the common exhaust line 240. The head of fluid built up by a continued fluid flow under pressure through the right end of the cylinder 244 is sufficient to lock the piston and rod in an extreme lefthand position. This movement of the rod 247 and the fork 79 is sufficient to move the gear 69 in the cluster 64 into mesh with the gear 77 on the shaft 71 in the fixed-step speed mechanism 26.

The gear cluster 64 must be retained in a neutral position on the splined shaft 48, whenever the cluster 63 is shifted into one of its two driving positions. This is accomplished in the following manner: When the hydraulic fluid is admitted to either one of the hydraulic control valves 120 or 121 to effect a power shifting operation of the gear cluster 63, the fluid is also admitted into a neutralizing chamber 257 in the center of the cylinder 244 in the secondary shifting mechanism 220. The width of this chamber is sufficient to permit flow of hydraulic fluid into the center of the cylinder 244, even though one or the other of the two pistons 245 or 246 therein is in an extreme actuated position. Thus, if the piston 246 had been previously actuated to accomplish a leftward movement of the shifter rod 247, the hydraulic fluid would be forced behind the left end of the piston and return it to its initial starting position at the extreme right end of the cylinder 244. In moving rightward, the piston will engage the enlarged portion 249 of the rod 247 and return the rod to its neutral position. Consequently, the gear cluster 64 will be moved on the spline shaft 48 to an out-of-contact position intermediate the gears 76 and 77 on the shaft 71 in the fixed-step speed mechanism 26. An exhaust port 258 in the end cap of the shifter casing at the right end of the shifter rod 247 serves to prevent the formation of a binding fluid or air pocket within the cylinder. Hydraulic fluid remaining in the ends of the cylinder 244 when either of the respective pistons 245 or 246 is forced to return to its respective end of the cylinder is exhausted through the ports 243 or 255 and the connecting line to atmosphere through the respective closed hydraulic control valve 122 or 123.

Movement of the primary gear cluster 83 is, likewise, accomplished hydraulically to shift the cluster into either one of two power driving positions on the primary splined shaft 80. After the shifting of both of the secondary gear clusters has been completed, the hydraulic circuit is opened to permit fluid flow from the secondary hydraulic shifting mechanism 220 through the common exhaust line 240 to an intake line 259 connecting with the intake port of each of the primary hydraulic control valves 124 and 125. When the fluid under pressure has reached this point, rotation of the cam control plate 100 will have been completed and, consequently, one or the other of the two control valves 124 or 125 will be positioned on an elevated actuating portion of the primary control cam 112 to permit a flow of fluid through the open valve.

If, for example, the valve 125 is opened, the hydraulic fluid will flow through the valve and a hydraulic line 260 to an intake port 261 at the left end of a cylinder 262 in the primary hydraulic shifting mechanism 221. A piston 263 integrally formed on a primary shifter rod 264 is axially disposed to slide within the cylinder 262. As fluid enters the left end of the cylinder 262 from the intake port 261, the piston and rod assembly will move rightward until an exhaust port 265 is exposed by the movement of the piston. The hydraulic fluid will then flow through the cylinder into the exhaust port, the fluid within the cylinder 262 serving to lock the piston 263 and the rod 264 in the extreme right-hand position, as shown in Fig. 9. The shifter fork 88 fixedly attached to the extreme left end of the rod 264 will move rightward and shift the gear 86 on the primary gear cluster 83 into engagement with the mating gear 89 on the shaft 71, as shown in Fig. 2. Thus, one driving train to the primary splined shaft 80 will have been completed to permit the shaft to be driven at a predetermined rate of speed.

If, on the other hand, the hydraulic control valve 124 is opened upon engagement of its piston with an elevated portion of the primary control cam 112, while the protruding end of the piston in the hydraulic control valve 125 was engaged with a depressed portion of the cam, the hydraulic fluid would, instead, flow from the intake line 259 through the opened control valve 124 and a hydraulic line 266 to an intake port 267 at the right end of the cylinder 262 in the primary hydraulic shifting mechanism 221. Since both ends of the piston 263 are chamfered, the hydraulic fluid from either of the intake ports 261 and 267 can enter the ends of the cylinder 262, even though the piston may then abut the end wall of the cylinder. Thus, the hydraulic fluid, upon entering the cylinder from the right hand intake port 267, will drive the piston 263 leftwardly until the central exhaust port 265 is exposed. The hydraulic fluid will then flow through the right end of the cylinder 262 and, in effect, will lock the piston 263 and shifter rod 264 in the extreme lefthand position during the entire time in which the cam control plate is permitted to remain in a particular predetermined position. Such a movement of the shifter rod 264, the fork 88 and the gear cluster 83 will bring the gear 85 into mesh with the gear 74. Any hydraulic fluid which remains in the cylinder 262 behind the piston 263, when it is actuated therein, is exhausted through the respective control valve to atmosphere. Thus, if the piston 263 was forced to move leftwardly, the hydraulic fluid remaining within the left end of the cylinder 262 would be forced out of the cylinder into the port 261 and the line 260 to the hydraulic control valve 125 and, since this valve is then closed, the fluid could escape through the auxiliary exhaust port 131 in the valve to atmosphere. On the other hand, if the piston was hydraulically forced to move rightwardly within the cylinder 262, hydraulic fluid remaining in the right end of the cylinder would be exhausted into the port 267 and the line 266 to atmosphere through closed hydraulic control valve 124. Since the gear cluster 83 is always in one of two driving positions, the piston 263 in the primary hydraulic gear shifting mechanism 221 will normally be positioned in one of two extreme positions at one of the ends of the cylinder 262.

The range change gear cluster 84 is slidably positioned on the primary shaft 80 in one of two driving positions, namely: wherein the gear 91 meshes with the gear 96 to effect operation in a low speed range or wherein the gear 92 is meshed with the gear 97 to effect a high speed range of operation of the tool retaining spindle 21. After the positioning of the primary gear cluster 83 has been completed for a particular cam plate setting and the exhaust port 265 in the center of the cylinder of the primary gear shifting mechanism 221 is exposed to permit a hydraulic flow into a line 270, one of the two hydraulic control valves 126 and 127 will be ready to initiate a shifting cycle within the range change hydraulic gear shifting mechanism 222 and, consequently, effect adjustment of the range change gear cluster 84.

One of the two range change hydraulic control valves 126 or 127 will have been opened through engagement with an elevated portion of the primary control cam 113. Thus, if the control valve 126 is open, as shown in the drawing, to permit fluid flow under pressure from the line 270 through the valve and a line 271 to an intake port 272 at the left end of a cylinder 273 in the shifter mechanism 222, the shifting mechanism will be actuated to move the gear 92 on the range change gear cluster into mesh with the high speed spindle gear 97. The hydraulic fluid under pressure will enter the left end of the cylinder 273 and force a piston 274 integrally formed with a shifter rod 275 rightward to an extreme righthand position in the cylinder 273. When the piston has reached this position, an exhaust port 276 in the middle of the cylinder 273 will be exposed to permit a continued flow of fluid through the cylinder, the fluid in the cylinder serving to lock the piston and rod assembly in the righthand position.

However, if the hydraulic circuit through the control valve 127 is opened through engagement with an actuating portion of the range change control cam 113, the fluid will be forced from the valve through a line 277 and an intake port 278 into the right end of the range change shifter mechanism cylinder 273. Since the ends of the piston 274 are chamfered, the fluid is able to enter the cylinder even though the piston is then against the end wall and force the piston and rod assembly leftwardly from the position shown in Fig. 9. Such movement will cause the fork 94 to move the gear 91 on the range change cluster 84 into engagement with the low speed spindle gear 96. When the piston 274 has reached the extreme lefthand position within the cylinder 273, the exhaust port 276 will be opened to permit a continued flow of fluid through the right end of the cylinder. The fluid flowing through this end of the cylinder will be sufficient to lock the piston and rod assembly in the aforesaid position and to lock the cluster 84 in position while the spindle is being driven at the desired speed. When the piston 274 is moving leftward, the fluid remaining in the left end of the cylinder will be forced therefrom through the port 272 and the line 271 to atmosphere through the closed control valve 126. If the piston 274 is hydraulically actuated toward the right end of the cylinder 273, the fluid remaining in the right end will be forced out of the cylinder into the port 278 and the line 277. The auxiliary exhaust port in the closed control valve 127 will then be open to permit the exhaust of this fluid to atmosphere.

The hydraulic control circuit for controlling the entire hydraulic mechanism includes an automatic control valve 280. This valve is mounted in the speed box frame 38, as shown in Fig. 3. As also shown in Fig. 9, the automatic valve 280 is comprised of a cylinder 281 and a comparatively long piston 282 slidably mounted therein. Six port grooves 283, 284, 285, 286, 287 and 288 are circumferentially disposed at fixed intervals along the cylinder wall 281. The piston 282 normally occupies a position at the extreme right end of the cylinder 281, as shown in Fig. 9 and consists of three landular surfaces 289, 290 and 291 and two undercut surfaces 292 and 293. One landular surface is located at each end of the piston while the third landular surface is centrally located thereon. The undercut surfaces are intermediately disposed between the three landular surfaces. A spring 294 abutting the left end of the cylinder and riding in a central axial bore 295 in the piston 282 retains the piston in the righthand position.

Hydraulic fluid is forced into the automatic valve 280 through a line 296 by a pump (not shown) from a sump (not shown) in the bottom of the columnar transmission cavity. As usual in machines of this type, the pump is driven by the driving motor (not shown) of the machine and is arranged to operate whenever the motor is running. Thus, the hydraulic control mechanism can be operated at any time after the motor is started. The hydraulic fluid under pressure is constantly available at the ports 285 and 287 in the automatic valve 280, both ports being connected directly to the line 296. With the piston 282 in the normal righthand position, the hydraulic fluid will flow into the cylinder 281 in the space provided by the undercut surface 293 on the piston 282. The hydraulic fluid is then free to enter the port 288 and a line 300. The line 300 serves to furnish fluid to the ten hydraulic control valves riding on the control cams and which control operation of the three hydraulic gear shifting mechanisms 220, 221 and 222, as previously described. When no shifting operation is taking place, the fluid flows freely through the valves and the shifting mechanisms, as previously explained, and discharges into the lubricating system.

The infinitely variable hydraulic control mechanism 141 is supplied with hydraulic fluid from a line 301 which extends from the port groove 287 in the automatic valve 280 to the intake port 151 in the mechanism 141. Since the pump line 296 and the line 301 are both connected to the same port groove 287 in the valve 280, hydraulic fluid will always be free to flow to the infinitely variable control mechanism. However, when the cam control plate 100 is manually rotated in order to select a desired spindle speed, one or more of the ten hydraulic control valves 118 to 127, inclusive, will be actuated to effect a shifting operation and, consequently, the flow of fluid through the system will be blocked, causing a back pressure upon the fluid in the line 300. At this instant, the full pressure of the fluid from the pump line 296 will be diverted into the line 301. This added pressure will be of sufficient magnitude to force the fluid through a connecting line 302 into a port 303 at the right end of the automatic valve cylinder 281. The hydraulic fluid will enter the end of the cylinder and force the piston 282 leftward against the pressure of the spring 294 and retain the piston in this position until the blocked condition in the hydraulic control valve circuit is eliminated at the completion of a shifting operation.

The clutch mechanism 29 may be actuated to an engaged position by the machine operator through the manipulation of a starting lever 305 horizontally mounted on the top left side of the column 20, as shown in Fig. 1. When this lever is moved counterclockwise, a shaft 306 extending downwardly into the columnar cavity 20 and a gear 307 keyed to the lower end of the shaft will be rotated to axially actuate a shifter rod 308 in a starting valve 310, the rod being provided with rack teeth 311 on its outer end which mesh with the teeth on the gear 307.

The starting lever 305 is turned counterclockwise in order to start the machine spindle 21, and the shifter rod 308 in the starting valve 310, as shown in Fig. 9, is moved rightwardly a sufficient distance to align a recessed portion 312 on a piston 313 slidably mounted in a safety valve cylinder 314 with a pair of ports 315 and 316. The hydraulic fluid will then flow from the pump line 296 through the port 285, the recess 292 and the port 284 in the automatic valve 280 and the line 304 to the middle intake port 315 in the starting valve 310. The fluid then enters the cylinder 314 via the recessed area 312 of the piston 313 and flows from the intake port 315 to the starting port 316 at the right end of the cylinder. From the port 316, the fluid flows through a line 317 to the intake port 183 in the clutch-brake control mechanism 177 and effects a rightward movement of the piston 180 therein, in a manner to engage the clutch mechanism 29, as previously described. A spring detent mechanism 318 is disposed perpendicular to the rod 308 in position to engage either one of a pair of notches 319 therein, depending upon the position of the rod. In this manner, the rod 308 retained in either one of two positions and is subject to movement through manipulation of the starting lever 305. When the piston 180 in the clutch shifting mechanism 177 is forced rightward, the hydraulic fluid in the right end of the cylinder is free to escape through the port 190, a line 320 and a port 321 adjacent the left end of the cylinder 314 in the starting valve 310 to atmosphere. Both ends of this valve are open to atmosphere and the flow of fluid is entirely dependent upon the position of the piston 313 in the cylinder.

When the machine tool clutch mechanism 29 is to be manually disengaged in order to stop the spindle 21, the operator need only shift the starting lever 305 clockwise a limited distance to a stop position. This movement will cause the shifter rod 308 to be moved leftward a sufficient distance so that the piston 313 attached thereto will be shifted to the lefthand stop position in the cylinder 314. The piston will then serve to block the left end of the cylinder and to divert the hydraulic fluid flow from the intake port 315 through a portion of the cylinder 314 adjacent the recessed piston area 312 to the stop port 321. The hydraulic fluid will then flow through the line 320 and the port 190 into the right end of the cylinder 179 in the clutch-brake hydraulic control mechanism 177 and effect a leftward movement of the piston 180 therein, which, in turn, will effect the disengagement of the clutch mechanism 29 and the application of the brake by the brake mechanism 33, in a manner previously described. Thus, the infinitely variable speed mechanism 25, the fixed-step speed mechanism 26 and the tool retaining spindle 21 driven thereby will be disconnected from the power source and braked to stand still. The hydraulic fluid remaining in the left end of the cylinder 179 will be forced from the cylinder by the leftward movement of the piston 180 into the port 183, the line 317 and the port 316 at the right end of the cylinder 314 in the starting valve 310 to atmosphere from the right end of the cylinder, which is then open.

The sequence of operation of the various hydraulic units, when changing the speed of the spindle, is best indicated on the hydraulic circuit diagram, shown in Fig. 9, in which all of the units are shown interconnected. The sequence of operation, as hereinafter described, will be similar for any setting of the cam control plate 100, although the actuation of the ten control valves to open or closed positions will vary for each of the sixteen major positions of the cam control plate. The assumed cam control plate setting is that indicated in Figs. 6 and 7. In order to simplify the explanation of the positioning of the ten hydraulic control valves on the various cams and the positioning of the infinitely variable control arm 115 on the infinitely variable control cam 114, each of the five cams are diagrammatically illustrated as of equal length, each made up of sixteen consecutively numbered sections. As shown in Fig. 7, the length of each cam actually differs from the length of the other cams, since each one is disposed on a different circumferential path. The cam control plate setting which has been selected for purposes of explanation is one of sixteen possible major settings required to shift the gear train in the fixed-step transmission 26 into its sixteen possible speed variations. At the same time, intermediate minor cam control plate settings determine an infinite number of variations of adjustment of the positive infinitely variable speed mechanism 25 for each one of the sixteen fixed-step speed ranges provided by the fixed-step speed mechanism 26.

The usual procedure in operating the machine tool requires that the operator start the driving motor by closing a starting switch. At this time, the starting lever 305 on the top of the column 20 should be set in a stop position in order that the tool retaining spindle 21 will not be driven. As soon as the motor is started, a supply of hydraulic fluid under pressure is available to the automatic valve 280 from the pump line 296. Since the starting lever 305 is in a stop position, the piston 313, on the rod 308 in the starting valve 310, is positioned at the extreme left end of the cylinder 314 to permit fluid flow through the automatic valve 280, the line 304, the starting valve 310 and the line 320 to the clutch-brake control mechanism 177. Consequently, the piston 180 then is positioned at the left end of the cylinder 179 in the mechanism 177 and the clutch mechanism 29 is held in disengaged position.

In selecting a spindle speed, the operator rotates the cam control plate 100 bearing the speed indicia in either direction to the desired speed setting indicated thereon. Upon turning the plate 100, the flow of fluid through the hydraulic control valves is momentarily blocked through operation of the valves and the shifter mechanisms. This effect is reflected back into the line 300 leading to the first pair of hydraulic control valves 118 and 119 from the automatic control valve 280. The resulting increase in pressure on the fluid in the line 301 connected to the port 287 is of sufficient magnitude to forcibly move the piston 282 in the valve to its extreme left hand position by forcing fluid through the line 302 and the port 303 into the right end of the cylinder 281. The landular surface 291 on the right end of the piston 282 then blocks the port 288 connected to the line 300, while the landular surface 290 blocks the port 285 connected to the pump line 296. Thus, the hydraulic fluid supply to the intake port 315 in the starting valve 310 is cut off and, consequently, the pressure upon the piston 189 in the clutch-brake mechanism 177 is relieved. At the same instant, the full force of the fluid is diverted around the undercut automatic valve piston surface 293 from the pump line port 287 into the port 286. This fluid then flows through a line 324, connecting with the port 286, to the infinitely variable control arm actuating unit 170. The fluid entering the bottom of the cylinder 171 will raise the piston 172 and the rod 149 upwardly until the actuating arm 115 associated with the infinitely variable control valve 141 is raised to an out-of-contact position in relation to the infinitely variable control cam 114, as previously explained. The cam control plate 100 can then be rotated in either direction without effecting repeated adjustments of the infinitely variable speed mechanism which would result if the arm 115 had to ride over each of the sixteen lugs of the infinitely variable control cam 114.

Fluid from the line 324 also flows through a line 325 connected thereto to the intake port 194 in the clutch-brake control mechanism 177. From the port 194, the fluid passes through the piston passages 195 and 197 into the right and left ends, respectively, of the cylinder 192, as previously explained. Since the fluid retaining the clutch-brake control piston 180 is no longer under pressure, the piston 191 will be forced to assume a central position in the cylinder 192, moving both the clutch and brake to a disengaged position. With the piston 191 in mid-position, the hydraulic fluid will flow from the port 194 into the port 200 and the line 201 connected thereto, since the recess 199 on the piston 191 will then be positioned directly over the ports 194 and 200. The passage of fluid into the left end of the cylinder 212 in the slow speed operating valve 202 from the line 201 will force the piston 213 rightward and, consequently, will actuate the clutch 208 in the slow speed drive mechanism 178. The spindle transmission mechanism, including the reverse gearing, the infinitely variable speed mechanism 25 and the fixed-step speed mechanism 26, will then be driven at a slow rate of speed, in order to facilitate the shifting of gears in the transmission. The operation of the clutch-brake control mechanism 177, the slow speed operating mechanism 202 and the infinitely variable control unit 170, as just described, occurs immediately after the rotation of the cam control plate 100 has created a blocked condition in the hydraulic circuit through the shifter mechanisms.

The piston 191 controls the action of the shifter rod 181 in the mechanism 177, and the fluid remaining in either end of the cylinder 179 is exhausted therefrom by the consequent corresponding movement of the piston 180. Thus, if the piston 180 is moved leftward, with the starting valve 310 in the position shown in Fig. 9, the fluid is exhausted from the left end of the cylinder 179 into the line 317, the closed cylinder 314 in the valve 310, the line 304, and the port 284, which is then connected by the undercut piston surface 292 with the automatic valve port 283 to atmosphere. The fluid, if any, remaining in the right end of the cylinder 179 in the mechanism 177 is exhausted, by a rightward movement of the piston 180, into the port 190, the line 320, the port 321 and the open left end of the starting valve cylinder 314 to atmosphere.

After the cam control plate 100 has been set at a desired point and the control mechanism 177 operated as described, the hydraulic fluid will flow from the slow speed actuating valve 202 into a line 326 connecting with the line 300. Since the port 288 in the automatic valve 280 is blocked, the fluid flowing from the line 326 into the line 300 will temporarily constitute the fluid supply source for the ten hydraulic control valves and the three shifter mechanisms. The line 300 is connected to the intake chamber associated with the control valves 118 and 119 riding on the elementary control cam 111. With the assumed setting of the cam control plate 100, the tapered end of the piston in the valve 118 is positioned on an elevated actuating portion of the cam to open the hydraulic circuit through the valve, while the extending end of the piston in the valve 119 will ride on a depressed portion of the cam, thereby closing the circuit to a feed line 327. Thus, the fluid will flow from the valve 118 through a line 328 to an intake chamber associated with the control valves 120 and 121 and to the neutralizing chamber 257 disposed in the middle of the cylinder 244 in the secondary hydraulic gear shifting mechanism 220. The passage to the neutralizing chamber 257 is direct and is so proportioned that the actuation of the piston and the shifter rod 247 to a neutral position will occur before the balance of the fluid from the line 328 has had a chance to flow from one of the control valves 120 and 121. Thus, the gear cluster 64, controlled by the actuation of the rod 247 in the shifting mechanism 220 will have been actuated to a neutral position on the splined shaft 48 in the fixed-step speed mechanism 26. The design of the hydraulic circuit is so constituted in order to insure the shifting of one of the two gear clusters 63 and 64 to a neutral position before the other is actuated to a driving position.

The exemplified setting of the cam control plate will cause the hydraulic control valve 120 to be opened since the tapered end of the piston extending therefrom will then engage an elevated actuating portion of the secondary control cam 110. The other three control valves 121, 122 and 123, associated with the cam 110 are then closed. Consequently, the hydraulic fluid will flow from the valve 120 through the line 231 and the port 232 into the left end of the cylinder 233 in the secondary hydraulic shifting mechanism 220. The piston 228 will be forced rightward into engagement with the contact collar 230 attached to the shifter rod 225 and, thereafter, will continue to move rightward until the exhaust port 234 is exposed. This movement of the piston and rod assembly will effect a corresponding movement of the gear cluster 63 into a power driving position on the splined shaft 48 in the fixed-step transmission 26. Since the slow speed drive mechanism 178 is already operating, the gear 66 in the gear cluster 63 will be slowly rotated as it is meshed with the gear 75, whereby a minimum of strain is imparted to the respective gear teeth. Any hydraulic fluid which remains behind the right end of the piston 228 is forced out of the cylinder 233 into the neutralizing chamber 241 and the line 327 to the control valve 119. Since this valve is closed, the line 327 will then be connected by an auxiliary port therein to atmosphere.

The hydraulic circuit from the valve 120 is temporarily blocked until the gear cluster 63 controlled thereby has actually been shifted into the predetermined position. Thereupon, the hydraulic fluid will continue to flow from the line 231 through the left end of the cylinder 233 into the exhaust port 234 and the common exhaust line 240. The fluid within the left end of the cylinder will lock the piston and rod assembly in the extreme righthand position. Thus, the gear 66 on the gear cluster 63 cannot be moved out of the driving position with the gear 75 as long as the cam control plate 100 remains in the adjusted position.

With the secondary gear cluster shifting cycle completed, the hydraulic fluid under pressure is made available to the control valves 124 and 125 controlling the primary gear shifting mechanism 221. The fluid from the common exhaust line 240 is directed into the line 259 and thence into the intake ports in the hydraulic valves 124 and 125. Since the tapered end of the piston associated with the control valve 125 is positioned on an elevated actuating portion of the primary control cam 112, the hydraulic circuit will be opened through the valve and the line 260. Thus, the fluid will enter the left end of the cylinder 262 in the primary gear shifting mechanism 221 through the port 261 and force the piston 263 and the shifter rod 264 rightward. The hydraulic fluid remaining in the right end of the cylinder at this time will be forced therefrom through the port 267, the line 266 and the auxiliary port in the valve 124 to atmosphere, because this valve is closed through engagement with a depressed portion of the primary control cam 112.

The rightward movement of the piston and rod assembly in the primary gear shifting mechanism 221 serves to shift the primary gear cluster 83 a corresponding distance until the gear 86 thereon is fully engaged with the gear 89. In order to aid the meshing of these gears, the fixed-step gear train up to and including the gear 89 is rotated at a slow rate of speed through the slow speed transmission 178. The piston 263 will be retained in the extreme righthand position in the cylinder 262 by the fluid in the left end of the cylinder, as long as the setting of the primary control cam 112 on the cam control plate 100 remains unchanged.

The primary gear cluster shifting cycle in the sequence of shifting the fixed-step transmission mechanism 26 has now been completed. Prior to this time, the circuit beyond the primary gear shifting mechanism 221 was blocked and rendered inoperable. Now, the hydraulic circuit is opened by the positioning of the piston 263 and, consequently, the fluid is free to flow from the exhaust port 265 in the cylinder 262 through the line 270 to the intake ports in the hydraulic control valves 126 and 127. The hydraulic circuit through the control valve 126 is opened because the tapered piston associated therewith is then positioned on an elevated actuating portion of the range change control cam 113. Thus, the fluid will flow from the valve 126 through the line 271 and the port 272 into the left end of the cylinder 273 in the range change gear shifting mechanism 222. The flow of fluid into this end of the cylinder will force the piston 274 rightwardly and, consequently, effect a corresponding movement of the shifter rod 275, the fork 94 and the gear cluster 84.

Hydraulic fluid remaining in the right end of the cylinder 273 behind the piston 274 is exhausted through the port 278, the line 277 and the auxiliary port in the control valve 127 to atmosphere. At this time, the tapered extending end of the piston in the control valve 127 is engaged with a depressed portion of the range change control cam 113 and is closed. Thus, the gear cluster 84 will be shifted forwardly until the gear 91 is meshed with the gear 96 keyed to the spindle 21. The fluid in the left end of the cylinder 273 of the shifting mechanism 222 holds the gear cluster 84 in the aforesaid position as long as the setting of the primary control cam 113 remains unchanged. Slow rotation of the gear 91 as it is slidably meshed with the gear 96 by the slow speed driving mechanism 178 serves to aid the meshing of the teeth of the two gears during the shifting operation.

As soon as the exhaust port 276 in the middle of the cylinder 273 in the range change gear shifting mechanism 222 is exposed by the rightward movement of the piston 274, the hydraulic fluid will flow into a return line 329 which, in turn, is connected to the line 304 extending between the automatic valve 280 and the starting valve 310. The fluid will then flow into the automatic valve cylinder port 284 and, since the piston 282 is still positioned in the left end of the cylinder, the fluid will flow through the undercut piston area 292 to the atmospheric port 283, through which it is exhausted. The drop in pressure in the hydraulic fluid, when the exhaust port 276 is opened to the line 329, is reflected back through the entire hydraulic circuit. Thus, the pressure on the fluid in the right end of the automatic valve cylinder 281 will be relieved and the spring biased piston 282 in the valve will be returned to the right end of the cylinder. This movement of the piston 282 will position the recessed portion 293 over the ports 287 and 288 and, consequently, the hydraulic fluid from the pump line 296 will again flow directly into the line 300. The flow through the ten hydraulic control valves 118 to 127 and through the three gear shifting mechanisms 220, 221 and 222 will then continue uninterruptedly as long as the cam control plate setting remains unchanged.

The return of the automatic valve piston 282 to the right end of the cylinder 281 will connect the line 324 and the port 286 with an internal piston passage 330. Since this passage connects with the axial bore 295 in the piston 282, the hydraulic fluid from the line 324 will exhaust into the left end of the cylinder 281 and to atmosphere through an exhaust port 331. Thus, the fluid will be able to drain from the cylinder 171 in the infinitely variable neutralizing unit 170 and permit the arm 115 to reengage an infinitely variable control cam lug and provide for speed selecting adjustment of the infinitely variable speed mechanism 25. As the arm 115 is lowered, due to the force of the spring 174, the shifter stem 140 extending downwardly into the infinitely variable hydraulic control valve 141 is, likewise, moved to lower the landular surface 154 to an operating position within the said valve. As previously explained, normal flow of hydraulic fluid into the piston cavity 152 and the diametrical passage 153 will effect an upward or downward movement of the piston 148 until the piston assumes a balanced position within the cylinder 149, as determined by the position of the land 154 on the stem 140. Thus, the diametrical ratios of the driving wheels 45 and 46 in the infinitely variable speed mechanism 25 will be adjusted to effect the desired output speed to the shaft 48 in the spindle transmission.

The opening of lines 324 and 325 to atmosphere by the return of the piston 282 in the automatic valve 280 to the right hand position will serve to disrupt the flow of fluid to the cylinder 192 in the clutch-brake control mechanism 177 and to the slow speed actuating valve 202. The flow of fluid into the end of the cylinder 192 in the mechanism 177, necessary to retain the piston 191 in a balanced neutral condition, will be stopped. Fluid remaining in the ends of the clutch-brake valve cylinder and in the left end of the slow speed valve cylinder 212 will be exhausted into the lines 325 and 324 and the port 330 and axial piston bore 295 to atmosphere through the end port 331. As soon as the pressure is removed from the fluid in the left end of the slow speed valve cylinder 212, the piston 213 will be returned to a left hand position and, consequently, the clutch 208 in the slow speed spindle drive mechanism 178 will be disengaged. The spindle transmission will no longer be driven through the slow speed mechanism 178. The piston 213, when in the left hand position, also serves to block the port 215 and prevent a reversed flow of fluid from line 300 into the line 326.

The hydraulic fluid, after completing the circuit through the ten control valves and shifter mechanisms, will return via the line 329 to the line 304. This fluid, together with that from the automatic valve 280 will then flow to the intake port 315 in the starting valve 310. Depending upon the position of the piston 313 in the valve, the hydraulic fluid will then flow to either one of the ports 316 or 321 adjacent the ends of the cylinder 314. Thus, if we assume that the starting lever 305 on the top of the column was left in the stop position, the fluid in the starting valve 310 will flow from the intake port 315 to the port 321. This fluid will then flow through the line 320 to the port 190 in the clutch-brake control mechanism 177 and force the piston 180 leftward by flowing into the right end of the cylinder 179. Consequently, the clutch and brake shifting mechanism connected to the piston 180 will be actuated to retain the clutch mechanism 29 in a disengaged position. Any hydraulic fluid remaining in the cylinder 192 behind the left end of the piston 191 will be forced out of the cylinder through the exhaust port 196 and the piston passageway 197.

Whenever it becomes desirable to operate the spindle 21, the operator need only move the starting lever 305 to a starting position whereby the piston 313 within the starting valve 310 will be shifted to permit a fluid flow through the valve into the left end of the cylinder 179 in the clutch-brake mechanism 177 to effect an engagement of the clutch mechanism 29. Whenever the starting valve 310 is in one of its two positions and the shifting operation in the fixed step transmission 26 has already been completed, all of the fluid from the return line 329, supplemented with some from the pump, is diverted through the starting valve 310 and the valve mechanism 177 to the exhaust port 185. This fluid then is fed into the lubrication system of the machine via line 186, as previously explained.

If the machine operator should rotate the cam control plate, in order to increase or decrease the spindle speed, while the spindle is rotating, the identical sequence of operation will occur, except that the clutch mechanism 29 would be disengaged by the movement of the piston 191 in the clutch-brake control mechanism 177. Thus, if the cam control plate 100 were rotated sufficiently to create a blocked condition in one of the opened hydraulic control valves, the back pressure in the lines would be sufficient to effect actuation of the piston 282 in the automatic valve 280 to the aforementioned left hand position. Thereupon, the piston 191 in the clutch-brake control mechanism 177 would be actuated, as well as the infinitely variable neutralizing unit 170. Since the pressure is then removed from the clutch-brake control piston 180 in the valve mechanism 177, the flow of fluid into the cylinder 192 disengages the clutch mechanism 29. The slow speed drive mechanism 178 then is connected to drive the transmission mechanism as the slow speed control valve 202 is energized. The cyclic shifting of the four gear clusters in the fixed-step transmission 26 may then be effected during the completion of the hydraulic circuit through the ten control valves 118 to 127 and the shifting mechanisms 220, 221 and 222. After the shifting operation has been completed, the release of back pressure on the automatic valve 280 will permit the return of the piston 282 therein to the normal right hand position. Since the starting lever 305 and, consequently, the starting valve 310 remain in a starting position, the hydraulic fluid will immediately flow into the left end of the cylinder 179 in the clutch-brake control valve mechanism 177 and force the piston 180 rightward to effect a reengagement of the spindle clutch mechanism 29.

A minor speed adjustment within the range of the particular fixed-step speed adjustment, as determined by the position of the cam control plate 100, is possible without effecting a disengagement of the clutch mechanism. Any movement of the cam control plate between the limits of the fixed-step speed cycle merely serves to raise or lower the actuating arm 115 in the infinitely variable hydraulic control valve mechanism 141. The opened and closed relationship of the ten hydraulic control valves 118 to 127 remains unchanged and, consequently, the hydraulic circuit is not blocked. Thus, the movement of the actuating arm 115 by the slight rotation of the infinitely variable control cam 114 on the cam control plate 100 will merely raise or lower the stem 140 in the valve mechanism 141. The position of the land 154 in relation to the diametrical passage 153 in the piston 148 will be changed to effect a corresponding change in the position of the piston in the cylinder 149 and, consequently, the spacing of the conical driving wheels 45 and 46 in the positive infinitely variable speed mechanism 25 will be changed to vary the effective diameters thereof. This is done without disrupting the power drive to the spindle transmission mechanisms and affords a means of slightly raising or lowering the output speed of the positive infinitely variable speed mechanism 25 and, consequently, the speed of the spindle 21. Thus, the operator is free to effect small spindle speed variations, without disrupting the cutting operation.

Several obvious variations of the aforedescribed invention become apparent, namely: The outer portion of the speed box frame 38, including the dial-cam plate 100 and the hydraulic control valves associated with the various cams on the said plate, could be readily disposed at some other convenient position on or about the machine with appropriate hydraulic line connections therefrom leading to the shifter mechanisms to provide a remote control for the spindle transmission. Likewise, a single hydraulic control dial and cam plate assembly may readily be adapted to control the gear shifting in two or more related transmissions wherein it would be desirable to have both transmissions operate at the same speed or at some fixed ratio of speeds.

Although the invention has been set forth herein by reference to particular exemplary embodiments, it will be apparent that various other modifications of these illustrative structures may be effected without departing from the spirit and scope of the invention, as defined in the subjoined claims.

The principles of the invention having now been fully explained in connection with the foregoing description of the illustrative embodying apparatus, the invention is hereby claimed as follows:

1. In a machine tool, a frame, a driven operating member movably mounted on said frame, a fixed step speed changing mechanism operatively connected to drive said driven member, a second fixed step speed changing mechanism operatively connected to drive said first fixed step mechanism, an infinitely variable speed changing mechanism operatively connected to drive said second fixed step speed changing mechanism, a power source for driving said mechanisms, a clutch selectively operable to connect said power source to said infinitely variable speed changing mechanism, a hydraulically operated actuating mechanism connected to each of said speed changing mechanisms and said clutch for operating them independently, a speed controlling apparatus, a plurality of control valves arranged to be actuated by said speed controlling apparatus, a source of fluid pressure, a control conduit connecting said source of pressure through certain of said control valves to the actuating mechanism associated with said first fixed step speed changing mechanism, another control conduit connecting said first actuating mechanism through others of said control valves to the actuating mechanism associated with said second fixed step speed changing mechanism, and pressure responsive means connected with said conduit circuit and operative upon an increase in pressure therein whenever any of said control valves are actuated to cause the hydraulic actuating mechanism associated with said clutch to actuate said clutch to a disengaged position.

2. In a machine tool having a frame and an operating member movably mounted on said frame, a plurality of fixed step speed changing mechanisms and an infinitely variable speed changing mechanism connected in series relationship to drive said operating member, a plurality of hydraulic actuators operatively connected to each of said speed changing mechanisms, each actuator being arranged to permit free flow of fluid therethrough except during a speed changing operation, a hydraulic control circuit interconnecting said actuators in series circuit relationship, speed control valves interspersed with said actuators in said control circuit, a power source, a clutch selectively engageable to connect said power source to said speed changing mechanisms, a hydraulic actuator operatively connected to engage or disengage said clutch, and a pressure responsive clutch control valve operatively connected to said hydraulic control circuit and to said clutch actuator and responsive to back pressure in said circuit to effect disengagement of said clutch, whereby said clutch will be disengaged automatically upon initiating a shifting movement through operation of any of said speed control valves.

3. In a machine tool having a frame and an operating member movably mounted on said frame, a plurality of fixed step speed changing mechanisms operatively connected in series relationship and connected to drive said operating member, a plurality of hydraulic actuators operatively connected respectively to each of said fixed step speed changing mechanisms, control conduits interconnecting said actuators in series circuit relationship, speed control valves interspersed with said actuators in said control circuit conduits, an infinitely variable speed changing mechanism operatively connected to drive said fixed step speed changing mechanisms, means to adjust said infinitely variable mechanism, and hydraulically actuated means connected to and responsive to pressure in said control circuit and operative to render said infinitely variable mechanism adjusting means inoperable while said actuators are effecting a speed adjusting operation upon said fixed step speed changing mechanisms, said pressure responsive means operating upon completion of a speed adjusting operation of said fixed step mechanism and the establishing of free flow through said series circuit to render said infinitely variable adjusting means operable for a subsequent adjustment of said infinitely variable speed changing mechanism.

4. In a machine tool, a driven operating member, a plurality of fixed step speed changing mechanisms operatively connected in series relationship to drive said operating member, an infinitely variable speed changing mechanism operatively connected to drive said fixed step mechanisms, a hydraulic actuating apparatus operatively connected to adjust each of said speed changing mechanisms independently, a source of fluid pressure, valve means arranged to admit pressure fluid to the actuating apparatus connected to the speed changing mechanism driving said driven member, a second valve means connected to receive pressure fluid from said actuating apparatus only after a shifting operation has been completed and operative to admit pressure to the actuating apparatus connected to another fixed step speed changing mechanism, means connected to receive pressure fluid from said latter actuating apparatus only after a shifting operation has been completed, and pressure responsive means operative to admit pressure to the actuating apparatus connected to said infinitely variable speed changing mechanism in response to reduction in pressure in said fixed step actuating apparatus upon completion of adjustment of all of said fixed step speed changing mechanisms.

5. A hydraulic control means to effect sequential positioning of the shiftable gear couplets in a transmission, comprising a movable indicia bearing cam plate, a series of cams on said plate, control valves disposed adjacent to said plate to be operably actuated through engagement with said cams and, a hydraulic shifter mechanism for each gear couplet in said transmission with said shifter connected to respective control valves with the control valves and the respective shifter mechanisms serially connected to provide a sequential operation of said mechanism, whereby one shifter mechanism must have completed its shifting cycle before the next succeeding shifter mechanism is hydraulically actuated.

6. A control means to sequentially control the movement of a series of shiftable gear clusters in a transmission and comprising a dial plate, speed indicia on said dial plate, a series of cams on said plate, control valves disposed to engage certain of said cams and, a shifter mechanism for each shiftable gear in the transmission operatively controlled from one of said cams to shift the respective gear clusters to one of several positions depending upon the selected position of said dial plate.

7. A hydraulic control mechanism to effectively shift gears in a transmission in a predetermined sequence into one of various combinations to complete a gear driving train therein, comprising a rotatable dial plate bearing speed indicia, a series of cams on said plate, control valves disposed for operable engagement with said cams, a hydraulic shifter mechanism for each shiftable gear cluster in the transmission, a closed hydraulic circuit interconnecting said control valves and said shifter mechanisms, and a hydraulically operated slow speed drive mechanism interconnected in said circuit and selectively connected to the transmission, whereby the adjustment of said dial will open said circuit and start said slow speed drive mechanism to drive said transmission while the gears therein are shifted in sequence to complete a predetermined gear train depending upon the speed indicia setting of said dial with said transmission remaining inoperable until the hydraulic circuit is again closed and all of said clusters have been shifted.

8. A control system for a machine tool having a fixed step transmission and an infinitely variable speed transmission, comprising a control dial, a series of cams operatively associated with said dial, hydraulic valves disposed to be operated through engagement with said cams, a source of fluid supply to said valves, hydraulic gear shifter mechanisms operably controlled by said valves to effect meshing of gears in the fixed step transmission, and a hydraulic control mechanism operatively controlled by one of said cams to effect adjustment of said infinitely variable speed transmission, whereby the actual shifting of gears in said fixed step transmission and the operation of said infinitely variable speed mechanism is accomplished hydraulically to effect a desired output speed therefrom through the manipulation of said dial.

9. A hydraulic control system disposed to operably effect a predetermined automatic control cycle in a machine tool transmission mechanism, comprising a hydraulic power source, an indicia bearing cam plate, a series of cams disposed on said plate, hydraulic control valves energized from said power source and disposed to be actuated through relative engagement with said cams, and hydraulic shifter means hydraulically connected to said valves and operatively connected to shift said transmission mechanism, whereby all of said shifter means are sequentially disposed to effect a predetermined control cycle according to the positioning of said valves on said cams.

10. A hydraulic control means for a machine tool having a fixed step transmission with several shiftable gear couplets, comprising a hydraulic shifter mechanism for each gear couplet, control valves operable to actuate said shifter mechanisms, a closed hydraulic circuit serially connecting said valves and said mechanisms, and a cam control plate presenting cams to selectively operate said valves, whereby for each position of said plate said valves are actuated to an open or closed position in a predetermined order and, in turn, actuate said shifter mechanisms in fixed sequence to position the gears on said couplets to a driving or neutral position.

11. A hydraulic control system to effectively shift the slidable gear clusters in a transmission, comprising a hydraulically actuated gear shifter mechanism for each of the gear clusters, a pair of control valves connected to control each of said mechanisms, cams disposed to operably engage said valves, a dial plate associated with said cams, and indicia on said dial, whereby said dial may be selectively set for a particular indicia and said cams will be correspondingly positioned to effect a predetermined sequence of operation of said shifter mechanisms and position each of said clusters in a driving or neutral position in a given pattern as determined from said cams.

12. A hydraulic control means disposed to control the positioning of a multiplicity of shiftable elements in a plurality of transmission units, comprising a dial plate with indicia, cams operably disposed relative to said dial, hydraulic valves positioned to be operated by said cams, hydraulic shifter mechanisms operably connected to effect the shifting of said elements, and a closed hydraulic circuit serially connecting said valves and shifters, whereby said control valves and shifters will function in a predetermined sequence and said transmissions are rendered inoperable until said circuit is completed and all of the shiftable elements have been positioned in a predetermined driving or neutral position depending upon the setting of said dial.

13. A control means for a positive infinitely variable transmission comprising a speed indicia bearing dial, a cam, a cam arm disposed to ride on said cam, an inner stem member disposed in the control means for axial movement imparted through said arm, a cylinder, a piston in said cylinder disposed to slidably support said stem member, hydraulic passages in said piston and stem members, an actuating arm associated with said piston, shifter control forks slidably mounted to effect speed varying control of the transmission, and a linkage means intermediate said actuating arm and said shifter forks, whereby any variation in the positioning of said cam as imparted by an adjustment of said dial will vary the position of said stem which, by changing the relationship of the hydraulic passages between said stem and piston, will hydraulically effect a movement of said piston and consequently of said speed changing forks associated with said transmission.

14. A hydraulic control system for a machine tool transmission comprising a rotatable dial plate, a cam plate actuated by said dial plate, control valves disposed adjacent said cam plate, a secondary cam on said plate disposed to operate certain of said valves, secondary shifters in said transmission hydraulically connected for operation by said secondary cam and valves, a primary cam on said cam plate disposed to operate other of said valves, a primary shifter in said transmission hydraulically connected for operation by said primary cam on said valves, a range change cam on said cam plate disposed to operate other of said valves, a range change shifter in said transmission hydraulically connected for operation through the positioning of said range change cam on said valves, and an interconnecting closed hydraulic circuit between all of said valves and shifters, whereby a predetermined sequence of operation is effected to complete a desired driving train in said transmission.

15. A hydraulic control mechanism for a machine tool comprising a rotatable cam control plate bearing speed indicia, a plurality of cams on said plate, hydraulic control valves operatively disposed to engage with certain of said cams, a hydraulic gear shifter for each shiftable gear cluster in the machine tool transmission, and a hydraulic circuit serially connecting said valves and said gear shifters, whereby each of such shifters is disposed to be actuated by one of said cams and in a predetermined sequence in order to obtain a selected output speed from said transmission.

16. In a hydraulic control mechanism for a serially connected infinitely variable speed and a fixed step transmission, a rotatable cam plate bearing speed indicia, a series of cams on the said plate, hydraulic control valves disposed to be actuated through engagement with certain of said cams, hydraulic gear shifting mechanisms for each of the shiftable gear clusters in said fixed step transmission connected to be hydraulically actuated by said control valves, and a hydraulic valve mechanism actuated by one of said cams to control said infinitely variable transmission after said circuit through the control valves and the shifter mechanisms associated with said fixed step transmission is completed.

17. In a hydraulic control mechanism for a machine tool transmission, a cam and dial plate, a plurality of cams on said plate, a series of control valves disposed to be actuated through engagement with certain of said cams, and a hydraulic shifter mechanism for each shiftable gear cluster in the transmission hydraulically connected to be controllably actuated through one of said cams and its associated control valves, whereby said transmission gears are selectively shifted into a driving position or a neutral position to complete one of a plurality of driving trains in said transmission.

18. A hydraulic speed control system for a fixed step transmission, comprising a hydraulic shifter mechanism for each shiftable gear cluster in the transmission, a hydraulic circuit for said mechanism, a series of cam operated valves in said circuit, and a dial and cam plate carrying speed indicia and a plurality of cams engaging said valves, whereby the manual adjustment of said dial to a desired transmission operating speed will cause said hydraulic system to automatically effect the shifting of said gear clusters as required to effect the desired speed.

19. A hydraulic control mechanism to effect predetermined automatic shifting for a positive infinitely variable and a fixed step transmission serially connected to be driven from a single power source comprising a rotatable dial and cam plate, valves disposed to engage the cams on said plate, a hydraulic circuit for each of said valves, hydraulic shifters disposed to effect gear shifting within the fixed step transmission with each shifter operably controlled through two of said valves, and a hydraulic valve mechanism disposed to be operated from one of said plate cams and to predeterminately operate said infinitely variable transmission through a complete cycle for each speed adjustment of said fixed step transmission.

20. A hydraulic control means for a machine tool having a fixed step and an infinitely variable transmission serially connected to drive a tool or work retaining member, comprising a hydraulic shifter mechanism for each shiftable gear cluster in the fixed step transmission, a hydraulic operating mechanism to effect the speed adjustment of the infinitely variable transmission, a dial plate presenting speed indicia, a series of cams disposed to operate with said dial plate, control valves positioned to be actuated by certain of said cams, and a hydraulic circuit serially interconnecting said shifter mechanisms, valves and operating mechanism, whereby said mechanisms operate in a fixed sequence to effect gear shifting in the fixed step transmission and adjustment of the infinitely variable transmission.

21. In a machine tool, a hydraulic control mechanism in combination with a fixed step transmission and a variable speed transmission comprising a manually adjustable dial, a cam plate unitarily operable with said dial, a plurality of cams on said plate, shifter mechanisms disposed to effect positioning of gear clusters in the fixed step transmission, hydraulic valves engaged by said cams on said cam plate to control the movement of said shifter mechanisms, a hydraulic shifter controlled by a cam on said cam plate to effect the positioning of said variable speed transmissions, and a hydraulic circuit serially interconnecting said valves, said shifter mechanisms and said hydraulic shifter.

22. In a machine tool, speed changing power transmission apparatus comprising a positive infinitely variable speed changing mechanism; a secondary speed changing gearing operatively connected to be driven by said positive infinitely variable speed changing mechanism; a primary speed changing gearing operatively connected to be driven by said secondary speed changing gearing; a range changing gearing operatively connected to be driven by said primary speed changing gearing; a source of power selectively connectible to drive said positive infinitely variable speed changing mechanism; speed selecting mechanism adjustable to select the speed of operation of said machine tool; control means operative in response to speed selecting movement of said speed selecting mechanism to reduce the rate of speed of said positive infinitely variable speed changing mechanism by said power source to a slow speed to facilitate gear shifting; and control means responsive to a speed selecting positioning of said speed selecting mechanism and operative to adjust said secondary speed changing gearing, said primary speed changing gearing, said range changing gearing, and said positive infinitely variable speed changing mechanism in accordance therewith successively, whereby the various elements of said gearing may be turned continuously by said power source at slow speed while being adjusted.

23. Control means for controlling sequential movements of a series of shiftable elements in a speed changing transmission mechanism, comprising a dial plate presenting speed indicating indicia and provided with a series of cam surfaces, a plurality of control valves disposed to be actuated by said cam surfaces in predetermined sequence, and element shifting mechanism operated by said control valves in response to actuation thereof by said cam surfaces to shift said shiftable elements in manner to effect a speed change in accordance with the indication of said dial plate.

24. Control means for controlling sequential movements of a series of shiftable elements in a speed changing transmission mechanism, comprising a speed indicating dial, a plurality of cams on said dial, a plurality of control valves disposed for actuation by said cams upon selective positioning of said dial, a hydraulic control system serially interconnecting said valves, and a plurality of hydraulic gear shifters operably disposed to shift said shiftable elements sequentially and hydraulically connected to said control system whereby the selective positioning of said dial serves to actuate said control valves in a manner to effect sequential hydraulic actuation of said shiftable elements and provide a closed hydraulic circuit when all of said shiftable elements are properly positioned.

THEODORE F. ESERKALN.

REFERENCES CITED

The following references are of record in the file of this patent:

UNITED STATES PATENTS

| Number | Name | Date |
|---|---|---|
| 1,573,354 | Methlin | Feb. 16, 1926 |
| 1,854,127 | Ferris | Apr. 12, 1932 |
| 2,203,743 | Parsons | June 11, 1940 |
| 2,240,973 | Armitage | May 6, 1941 |
| 2,308,708 | Nenninger et al. | Jan. 19, 1943 |
| 2,345,171 | Armitage et al. | Mar. 28, 1944 |
| 2,382,934 | Armitage | Aug. 14, 1945 |